(12) United States Patent
Turner et al.

(10) Patent No.: US 10,160,070 B2
(45) Date of Patent: *Dec. 25, 2018

(54) METHOD FOR ASSEMBLING AN AIRCRAFT STRUCTURE ASSEMBLY WITHOUT USE OF ANY OF SHIMMING, LOCATING FIXTURES AND FINAL-HOLE-SIZE DRILL JIGS

(71) Applicant: THE BOEING COMPANY, Huntington Beach, CA (US)

(72) Inventors: David Ray Turner, Saint Peters, MO (US); Donald L. Erion, Berkeley, MO (US); Teresa M. Finchamp, Berkeley, MO (US); Gregory Jon Goodman, Berkeley, MO (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/846,508

(22) Filed: Dec. 19, 2017

(65) Prior Publication Data

US 2018/0104775 A1    Apr. 19, 2018

Related U.S. Application Data

(63) Continuation of application No. 14/703,550, filed on May 4, 2015, now Pat. No. 9,925,625.

(51) Int. Cl.
*B23P 15/00* (2006.01)
*G05B 19/4097* (2006.01)
(Continued)

(52) U.S. Cl.
CPC ............... *B23P 15/00* (2013.01); *B64F 5/10* (2017.01); *G05B 19/4097* (2013.01);
(Continued)

(58) Field of Classification Search
CPC ....... B23P 15/00; B23P 2700/01; B23P 19/04; B23P 19/10; B64F 5/10; B64F 5/0009;
(Continued)

(56) References Cited

U.S. PATENT DOCUMENTS

| 5,033,014 A | 7/1991 | Carver et al. |
| 6,808,143 B2 | 10/2004 | Munk et al. |

(Continued)

FOREIGN PATENT DOCUMENTS

| CN | 103699055 A | 4/2014 |
| EP | 0290809 A2 | 11/1988 |
| EP | 2824439 A2 | 1/2015 |

OTHER PUBLICATIONS

CNC Concepts, Inc, "Training Material for CNC, Learning more about CNC Concepts, Inc." https://www.cncci.com/resources/tips/mean.htm, Retrieved Mar. 11, 2015.

(Continued)

*Primary Examiner* — Sarang Afzali
(74) *Attorney, Agent, or Firm* — Womble Bond Dickinson (US) LLP

(57) ABSTRACT

A method is provided for assembling an aircraft structure assembly composed of a plurality of sections without use of any shimming, locating fixtures or final-hole-size drill jigs. The method includes supporting a first and second frame sections on respective adjustable supports, and positioning an interconnecting frame section therebetween. The method includes aligning first pre-drilled mating holes in the interconnecting frame section, and installing fasteners through the aligned, first pre-drilled mating holes. The method includes aligning second pre-drilled mating holes in structural mating sections, and installing fasteners through the aligned, second pre-drilled mating holes. The method includes positioning the structural mating sections relative to the first and second frame sections and the interconnecting (Continued)

frame section. The structural mating sections are assembled inwardly from the first and second frame sections that form an outer perimeter structure of the aircraft structure assembly.

14 Claims, 15 Drawing Sheets

(51) Int. Cl.
  *G05B 19/418* (2006.01)
  *B64F 5/10* (2017.01)

(52) U.S. Cl.
  CPC .... *G05B 19/41805* (2013.01); *B23P 2700/01* (2013.01); *Y02P 90/04* (2015.11); *Y10T 29/49947* (2015.01); *Y10T 29/49948* (2015.01); *Y10T 29/49956* (2015.01); *Y10T 29/49963* (2015.01)

(58) Field of Classification Search
  CPC .......... G05B 19/41805; G05B 19/4097; Y10T 29/49622; Y10T 29/49895; Y10T 29/49899; Y10T 29/49902; Y10T 29/49948; Y10T 29/49956; Y10T 29/49963; Y02P 90/04
  See application file for complete search history.

(56) References Cited

U.S. PATENT DOCUMENTS

| | | | |
|---|---|---|---|
| 6,842,978 B2 | 1/2005 | Britt et al. |
| 6,922,599 B2 | 7/2005 | Richey |
| 8,661,684 B1 | 3/2014 | Boyd et al. |
| 8,934,994 B1 | 1/2015 | Lee |
| 2013/0019446 A1 | 1/2013 | Venskus et al. |
| 2014/0157588 A1 | 6/2014 | Boyd et al. |

OTHER PUBLICATIONS

John Hartmann et al., "Determinate Assembly of Tooling Allows Concurrent Design of Airbus Wings and Major Assembly Fixtures", Electroimpact, Inc., 2004 Society of Automotive Engineers, Inc. 2004-01-2832.

European Search Report dated Oct. 18, 2016 for Application No. 16161369.0.

METHOD FOR ASSEMBLING AN AIRCRAFT STRUCTURE ASSEMBLY WITHOUT USE OF ANY OF SHIMMING, LOCATING FIXTURES AND FINAL-HOLE-SIZE DRILL JIGS

CROSS-REFERENCE SECTION

This application is a continuation of U.S. patent application No. 14/703,550, filed May 4, 2015, now U.S. Pat. No. 9,925,625, issued Mar. 27, 2018, entitled: Assembly of an Aircraft Structure Assembly without Shimming, Locating Fixtures or Final-Hole-Size Drill Jigs, the content of which is incorporated herein by reference in its entirety.

TECHNOLOGICAL FIELD

The present disclosure relates generally to aircraft part machining and assembly and, in particular, to assembly of an aircraft structure assembly without use of any shimming, locating fixtures or final-hole-size drill jigs.

BACKGROUND

Complex manufacturing projects such as the design and manufacture of aircraft generally require the successful integration of design engineering, manufacturing engineering and sometimes numerical control (NC) programing. The production of aircraft, for example, typically requires the successful integration of hundreds of thousands of parts and associated processes according to a comprehensive plan to produce an aircraft in accordance with engineering design data, and includes the automated manufacturing of a number of components, assemblies and sub-assemblies according to NC programming techniques.

Design engineering often makes use of graphic, calculation intensive computer-aided design (CAD) systems to prepare drawings, specifications, parts lists and other design-related elements. In modern CAD systems, component parts are designed by geometrically modeling them in three-dimensions (3D) to obtain a component definition. Designing and developing complex 3D geometry models for many modern aircraft component parts is a powerful but expensive and intricate process where component part performance and design constraints are balanced against manufacturing capability and cost. Manufactures expend large amounts of effort and resources balancing these issues. A key product of this effort is the 3D geometry models of component parts and assemblies of component parts including their respective predefined dimensional tolerances. The bulk of the manufacturing process revolves around efficiently achieving the constraints defined in and between 3D geometry models of component parts and assemblies.

Currently, modern manufacturers expend a significant percentage of their resources to develop and refine 3D geometry models for each component part and assembly. Engineers must then create two-dimensional (2D) drawings to detail, and include dimension and tolerance ranges for the component part features and assembly configurations. This process defines the 2D drawing as the configuration control and the "authority for manufacturing." This process requires generating a series of 2D perspectives of the components have to be created and, thereafter, the tolerances have to be assigned and detailed on a 2D drawing, where tolerance ranges are assigned based on fit and function of the component part features. For example, in the case of mounting holes centered in two co-planar 1-inch wide flanges that fit alongside of each other, the nominal width dimension is 1.000 inch and the tolerance for the width of the flange should be +0.000/−0.030 inch since positioning two flanges having a width greater than 1.000 alongside each other would cause the centered mounting holes to be shifted further apart from each other and potentially interfere with hole alignment in a mating component. By assigning a tolerance of 1.000+0.000/−0.030 inch the flange width could be machined to a dimension less than 1.000 inch, which would merely leave a gap between the flanges when positioned alongside each other and assembled via the mounting holes.

Thus, for a part flange having a nominal flange width of 1 inch, a 2D part drawing with this assigned tolerance of 1.000+0.000/−0.030 inch would result in the manufacturer setting up machining of the flange at a midpoint of the tolerance, at the dimensional width of 0.985 inches (+0.015/−0.015 inch), to allow for possible manufacturing variations resulting in a width above and below the 0.985 inch width that would nevertheless remain within the 2D drawing tolerance of 1.000+0.000/−0.030 inch.

This process of manufacturing part features to fall within tolerance ranges also typically results in gaps for shimming component parts at assembly, and an inexact definition of the shape of part details; and the resulting component parts or their assembly is then often forced into shape using multiple large tools during manufacturing.

During NC programming and manufacture, NC programs are often designed to machine widths and features of component parts not to nominal dimensions (e.g., 1.000 inch), but rather to a specific dimension within the tolerance range specified in the 2D part drawing (e.g., 1.000+0.000/−0.030), such that manufacturing variations would nevertheless remain within the 2D drawing tolerance to mitigate risk of nonconformance.

NC machining tools could also be set up to machine holes or features to one end or another of their various dimensional tolerances to allow for wear and maximize the usefulness of tools used to machine the parts, or reduce machining time. For example, instead of a nominal size for a hole to be machined, a machinist may install a hole-forming tool or drill bit of a size that is within the tolerance but shifted towards one end of the tolerance range, which would result in hole diameters that initially are at one end of the tolerance range, and as the drill bit wears the resulting hole diameters shift towards the other end of the tolerance range, such that a maximum number of parts may be produced using the drill bit as it gradually wears and the hole diameter changes but remains within tolerance, to thereby prolong the time before the drill bit needs to be replaced with another drill bit.

In another example, the path of a milling machine may be programmed to mill to a minimum pocket depth allowed to remain in tolerance, which may reduce the number of repeated machine tool path passes needed to achieve a pocket depth that is within the tolerance range during the machining process. This in turn may reduce the total machining time and could reduce the risk of thin-wall cracking to mitigate the risk of nonconformance.

After manufacturing component parts, conventional manufacturing techniques are used for assembling component parts to produce assemblies, some of which may be sub-assemblies for even larger assemblies. Traditionally this process has relied on fixtured tooling techniques that force component parts into certain positions and temporarily fastens them together to locate the parts relative to pre-defined engineering requirements. For component parts joined and secured together by fasteners, the assembly process also typically involves pre-drilled pilot holes in one of the joined parts, and a final-hole-size drill jig to drill out the pilot holes and through the other of the joined parts, to thereby produce holes of the desired final size in both parts.

The use of the aforementioned shimming, as well as the locating fixtures and final-hole-size drill jigs during assembly is costly, and often results in a high-level of nonconformance that must be repaired. The traditional assembly process also often involves use of multiple shims, which also adds cost and time. Some techniques have been developed that involve scanning component parts after assembly, and then programming each mating part (customized to a single assembly) to exactly match the surface. But this requires the repeated assembly and disassembly of the component parts to complete the assembly process.

BRIEF SUMMARY

Example implementations of the present disclosure are directed to improved aircraft part machining and assembly. In accordance with example implementations, a three-dimensional (3D) geometry model for a part in which its surface features and holes may be modeled to nominal dimensions of the finished part. A numerically-controlled (NC) machining program may be generated directly from the 3D geometry model, without 2D drawings of the part—and hence the gaps for shimming and inexact definitions that often accompany 2D drawings. The part may then be machined to the nominal dimensions from the 3D geometry model on a single NC machining apparatus, instead of to one end or another of its various dimensional tolerances.

Parts machined according to example implementations may include holes machined to substantially a nominal diameter. Relative to the assembly of the machined parts, these holes may be pre-drilled (drilled during machining and prior to assembly). The holes being machined to substantially a nominal diameter may enable the assembly without use of any shimming, locating fixtures or final-hole-size drill jigs (i.e., without use of any shimming, without use of any locating fixtures and without use of any final-hole-size drill jigs). Example implementations utilize the inherent capability of modern NC machines to archive accuracy to allow alignment of all holes in the assembly. The parts may be machined exactly as modeled (designed), without requiring interpretation by either the machinist or downstream assembly operator or team.

More particularly, parts may be machined substantially to nominal, which may allow their assembly without shimming. Pre-drilled holes in the parts may be used for alignment and assembly of the parts, without requiring multiple part locating fixtures; and by the holes being pre-drilled, the parts may be assembled without final-hole-size drill jigs for drilling the holes at assembly. The parts may be assembled without scanning a part to obtain its surface profile for machining a mating part profile. Parts may be machined at multiple supplier locations, and yet be easily fit together at assembly.

From at least the foregoing, example implementations may reduce the cost of assembling aircraft structure assemblies by decreasing their assembly time, reducing rework, reducing required tooling, and eliminating shims. The resulting aircraft structure assembly may be a higher-quality assembly due to superior part fit. Example implementations may also add little to no additional cost at the supplier base, reduce the potential foreign object debris, and/or reduce the cost of quality for holes that are not drilled to blueprint.

The present disclosure thus includes, without limitation, the following example implementations. In some example implementations, a method is provided for assembling an aircraft structure assembly without use of any shimming, locating fixtures or final-hole-size drill jigs. The aircraft structure assembly is composed of a plurality of sections including first and second frame sections, an interconnecting frame section and a plurality of structural mating sections. The method includes supporting the first and second frame sections on respective adjustable supports positioned to align the first and second frame sections in a spaced-apart relationship, and positioning the interconnecting frame section between the first and second frame sections. The method includes aligning first pre-drilled mating holes in the interconnecting frame section with first pre-drilled mating holes in the first and second frame sections, and installing fasteners through the aligned, first pre-drilled mating holes. For each structural mating section of a plurality of structural mating sections, the method includes positioning the structural mating section relative to the first and second frame sections and interconnecting frame section. And for each structural mating section of a plurality of structural mating sections, the method includes aligning second pre-drilled mating holes in the structural mating section with second pre-drilled mating holes in at least one of the interconnecting frame section, first frame section or second frame section, and installing fasteners through the aligned, second pre-drilled mating holes to secure the structural mating section.

In some example implementations of the method of the preceding or any subsequent example implementation, or any combination thereof, the method further comprises positioning the adjustable supports at baseline positions for positioning and aligning the first and second frame sections in the spaced-apart relationship, with the adjustable supports being positioned using a laser metrology system.

In some example implementations of the method of any preceding or any subsequent example implementation, or any combination thereof, the method further comprises numerically-controlled machining at least two of the sections based on respective three-dimensional geometry models thereof. In these example implementations, the at least two of the sections in the respective three-dimensional models have an identical mating surface feature profile such that the at least two of the sections are machined to have a substantially identical mating surface feature profile.

In some example implementations of the method of any preceding or any subsequent example implementation, or any combination thereof, the structural mating section is positioned, the second pre-drilled mating holes are aligned and fasteners are installed through the aligned, second pre-drilled mating holes, for the plurality of structural mating sections to assemble the aircraft structure assembly inwardly from the first and second frame sections that form an outer perimeter structure thereof.

In some example implementations of the method of any preceding or any subsequent example implementation, or any combination thereof, the first and second frame sections are respectively leading edge and aft frame sections, and the interconnecting frame section includes inner and outer span-wise sections. In these example implementations, positioning the interconnecting frame section includes positioning the inner and outer span-wise sections between the leading edge and aft frame sections without use of any shimming, locating fixtures or final-hole-size drill jigs.

In some example implementations of the method of any preceding or any subsequent example implementation, or any combination thereof, the first pre-drilled mating holes are pre-drilled prior to alignment of the first pre-drilled mating holes. In these example implementations, the first pre-drilled mating holes are pre-drilled to substantially a nominal hole diameter that is a final hole size for a class hole diameter corresponding to a fastener, such that installing the fasteners includes inserting the fasteners through the aligned, first pre-drilled mating holes without use of locating fixtures for positioning and securing the interconnecting frame section and first and second frame sections relative to each other.

In some example implementations of the method of any preceding or any subsequent example implementation, or any combination thereof, the second pre-drilled mating holes are pre-drilled prior to alignment of the second pre-drilled mating holes. In these example implementations, the second pre-drilled mating holes are pre-drilled to substantially a nominal hole diameter that is a final hole size for a class hole diameter corresponding to a fastener, such that installing the fasteners includes inserting the fasteners through the aligned, second pre-drilled mating holes without use of locating fixtures for positioning and securing the structural mating section and the at least one of the interconnecting frame section, first frame section or second frame section relative to each other.

In some other example implementations, a method is provided for assembling an aircraft wing assembly without use of any locating fixtures for alignment of the sections or final-hole-size drill jigs for drilling holes. The aircraft wing assembly is composed of a plurality of sections including leading edge and aft frame sections, inner and outer span-wise sections and a plurality of internal structural members. The method includes supporting the leading edge and aft frame sections on respective adjustable supports positioned to align the leading edge and aft frame sections in a spaced-apart relationship, and positioning the inner and outer span-wise sections between the leading edge and aft frame sections. The method includes aligning first pre-drilled mating holes in the inner and outer span-wise sections with first pre-drilled mating holes in the leading edge and aft frame sections, and installing fasteners through the aligned, first pre-drilled mating holes, to thereby form an outer perimeter structure of the aircraft wing assembly. For each internal structural member of the plurality of internal structural members, the method includes positioning the internal structural member within the outer perimeter structure. And for each internal structural member of the plurality of internal structural members, the method includes aligning second pre-drilled mating holes in the internal structural member with second pre-drilled mating holes in at least one of another internal structural member, the inner span-wise section or outer span-wise section, and installing fasteners through the aligned, second pre-drilled aligned holes to secure the internal structural member. The aircraft wing assembly is assembled inwardly from the outer perimeter structure.

In some example implementations of the method of any preceding or any subsequent example implementation, or any combination thereof, the plurality of internal structural members includes a main spar. For the main spar, positioning the internal structural member comprises positioning the main spar within the outer perimeter structure. And for the main spar, aligning second pre-drilled mating holes comprises aligning second pre-drilled mating holes in the main spar with second pre-drilled mating holes in at least one of another internal structural member, the inner span-wise section or outer span-wise section, and installing fasteners through the aligned, second pre-drilled aligned holes to secure the main spar.

In some example implementations of the method of any preceding or any subsequent example implementation, or any combination thereof, the aircraft wing assembly is further composed of one or more outer skin portions. In these example implementations, the method further comprises without use of any locating fixtures or final-hole-size drill jigs, positioning the one or more outer skin portions relative to the outer perimeter structure, and aligning third pre-drilled mating holes in the one or more outer skin portions with third pre-drilled mating holes in the outer perimeter structure, and installing fasteners through the aligned, fourth pre-drilled mating holes to secure the one or more skin portions.

In some example implementations of the method of any preceding or any subsequent example implementation, or any combination thereof, the method further comprises positioning the adjustable supports at baseline positions for positioning and aligning the leading edge and aft frame sections in the spaced-apart relationship, with the adjustable supports being positioned using a laser metrology system.

In some example implementations of the method of any preceding or any subsequent example implementation, or any combination thereof, the method further comprises numerically-controlled machining at least two of the sections based on respective three-dimensional geometry models thereof, with the at least two of the sections in the respective three-dimensional models having an identical mating surface feature profile such that the at least two of the sections are machined to have a substantially identical mating surface feature profile.

In some example implementations of the method of any preceding or any subsequent example implementation, or any combination thereof, the first pre-drilled mating holes are pre-drilled prior to alignment of the first pre-drilled mating holes. In these example implementations, the first pre-drilled mating holes are pre-drilled to substantially a nominal hole diameter that is a final hole size for a class hole diameter corresponding to a fastener, such that installing the fasteners includes inserting the fasteners through the aligned, first pre-drilled mating holes without use of locating fixtures for positioning and securing the inner and outer span-wise sections and leading edge and aft frame sections relative to each other.

In some example implementations of the method of any preceding or any subsequent example implementation, or any combination thereof, the second pre-drilled mating holes are pre-drilled prior to alignment of the second pre-drilled mating holes. In these example implementations, the second pre-drilled mating holes are pre-drilled to substantially a nominal hole diameter that is a final hole size for a class hole diameter corresponding to a fastener, such that installing the fasteners includes inserting the fasteners through the aligned, second pre-drilled mating holes without use of locating fixtures for positioning and securing the internal structural member and the at least one of the other internal structural member, the inner span-wise section or outer span-wise section relative to each other.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
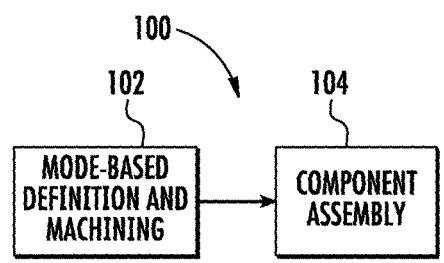
FIG. 1 illustrates a system according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Example implementations of the present disclosure are generally directed to aircraft part machining and assembly and, in particular, to model-based definition for machining aircraft parts, and assembly of parts without use of any shimming, locating fixtures or final-hole-size drill jigs. FIG. 1 illustrates a system 100 according to example implementations of the present disclosure. The system may include any of a number of different subsystems (each an individual system) for performing one or more functions or operations. As shown, for example, the system may include one or more of each of a model-based definition and machining subsystem 102 and component assembly subsystem 104. Although shown as part of the system, it should be understood that either or both of the subsystems may function or operate as a separate system without regard to the other subsystem. It should also be understood that the system may include one or more additional or alternative subsystems than those shown in FIG. 1.

The model-based definition and machining subsystem 102 is generally configured to enable the design and modeling of aircraft parts in a manner whereby the parts may be machined and assembled without shimming, multiple part locating fixtures, or final hole-size drill jigs. These aircraft parts may include, for example, rough castings, forgings, rough composite components and the like. The model-based definition and machining subsystem may create a three-dimensional (3D) geometry model for aircraft parts—such as relational 3D computer-aided design (CAD) models for mating parts—with surface features, holes and locations sized and toleranced to reliably fit at assembly, when using shimless/no drill assembly techniques.

The model-based definition and machining subsystem 102 may be configured to create a 3D geometry model of an aircraft part in which its features may be sized to nominal dimensions of the finished part exactly to a desired final shape. A numerically-controlled (NC) machining program—such a computer NC (CNC) machining program—may be generated directly from the 3D geometry model, and an appropriate NC machining apparatus may be configured to machine the part to the nominal shape of the desired part per the 3D geometry model. The part may be machined to the exact nominal dimensions of the NC machining program, instead of overriding in certain locations as is generally common practice. The resulting parts may then be assembled using no shims, minimal tooling and no drilling at the time of assembly of the aircraft components. In this regard, the model-based definition and machining subsystem may utilize an inherent capability of modern NC machining apparatuses to archive accuracy to allow all holes in the assembly to line up. The parts may be machined exactly as modeled (designed), without interpretation by either a part supplier or downstream assembly team.

The component assembly subsystem 104 may be generally configured to enable the assembly of aircraft structure assemblies composed of sections, such as sections machined through the model-based definition and machining subsystem 102. The component assembly subsystem may enable the assembly of aircraft structure assemblies with sections machined at multiple supplier locations, without shimming, multiple part locating fixtures, or final hole-size drill jigs. In accordance with example implementations of the present disclosure, sections of the structure assembly include pre-drilled fastener holes that may be used for alignment and assembly of the sections. The fastener holes may be pre-drilled prior to assembly, as opposed to during assembly using drill jigs, with most if not all of the holes being drilled at the time of detail machining. The component assembly subsystem may also enable the assembly of parts without scanning a part to obtain its surface profile for machining a mating part profile. Through the system 100 of example implementations, aircraft parts may be designed, machined and assembled in less time, with reduced rework, reduced tooling and without shims. This may result in higher-quality structure assemblies due to superior section fit. The system may be implemented without additional cost at the supplier base, it may reduce potential foreign object debris, and/or it may reduce the cost of quality for holes that are not drilled to blueprint.

Figure 2:
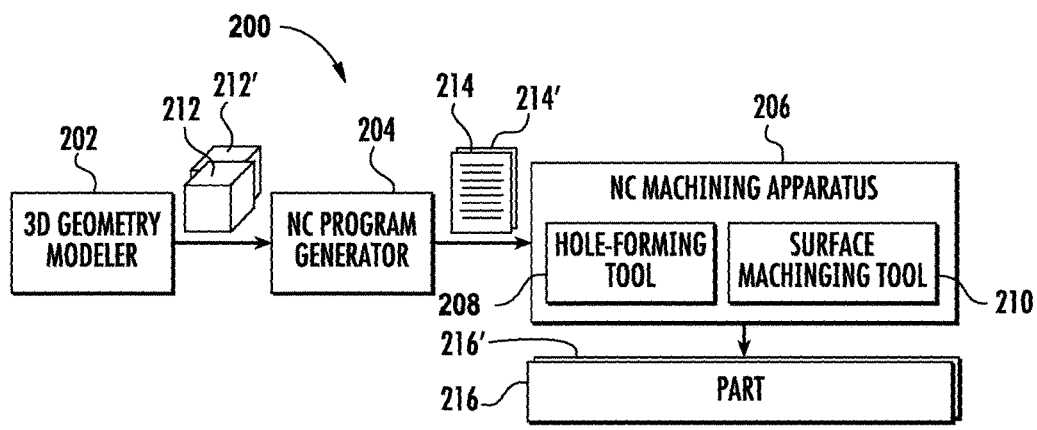
FIG. 2 illustrates a model-based definition and machining system, according to some example implementations.

FIG. 2 illustrates a model-based definition and machining system 200 that in some examples may correspond to the model-based definition and machining subsystem 102 of FIG. 1. The model-based definition and machining system may include one or more of each of a number of components coupled to one another, such as a 3D geometry modeler 202, a NC program generator 204, and a NC machining apparatus 206 with a hole-forming tool 208 and/or surface machining tool 210. In some examples, however, the model-based definition and machining system may include only a single NC machining apparatus.

The 3D geometry modeler 202 may be configured to create a 3D geometry model 212 for an aircraft part having surface features and holes represented thereby. For this, in some examples, the 3D geometry modeler may be, include or otherwise benefit from a commercially-available CAD system, such as the CATIA digital modeling system, available from Dassault Systèmes S.A. of Vélizy-Villacoublay, France. According to example implementations of the present disclosure, the surface features and holes in the 3D geometry model are sized to respectively a nominal surface feature dimension and a nominal hole diameter, and may have respectively a surface-feature tolerance range and a hole-diameter tolerance range related thereto that may be based upon form, fit or function of the part. More generally, the 3D geometry model for the aircraft part may include a 3D wireframe or solid model of the aircraft part, as well as engineering data required to machine or inspect the part. This engineering data may include the aforementioned surface-feature tolerance range and hole-diameter tolerance range (one or more of each), as well as include flag notes, finish requirements and the like.

In an example implementation, a 3D geometry model for an aircraft part is created with surface features and holes sized to fit and function, such as a standard fastener hole size or an integer-value flange width for example, and an NC program is created directly from the 3D geometry model for the aircraft part. The NC program includes program instructions to machine the holes and surface features to the nominal dimensions that are specified in the 3D geometry model for the aircraft part, where the nominal dimension means the geometry model value of a dimension or the as-modeled size and profile of surface features and holes created in the 3D geometry model, as opposed to a median dimensional value that falls within or part-way between a tolerance range for a hole diameter or feature of the aircraft part.

The NC program generator 204 may be configured to generate a NC machining program 214 directly from the 3D geometry model 212, and in some examples may be, include or otherwise benefit from a commercially-available CAD system (e.g., CATIA). The NC machining program may have instructions for the single NC machining apparatus 206 to machine the aircraft part including its surface features and holes, including instructions to machine the holes to the nominal hole diameter specified in the 3D geometry model for the part. Accordingly, manufacturing facilities may be required to create an NC program from the 3D geometry model so as to include program instructions to machine holes and surface features to the nominal dimensions in the 3D geometry model, instead of creating NC program instructions that change the nominal dimension to a specific dimension within the tolerance range in a 2D part drawing that would allow for manufacturing variations and reduce the likelihood of dimension variations exceeding tolerance limits (mitigating risk of nonconforming parts). In one example, the tolerance range is increased (e.g., expanded, relaxed) for hole and surface feature dimensions, to reduce nonconformance concerns of manufacturing facilities machining the parts and encourage manufacturing facilities not to change or shift NC-programmed dimensions away from nominal dimensions specified in the 3D geometry model (e.g., a 1.00 inch nominal width dimension) to a different dimension within the tolerance range (e.g., a 0.985 dimension within a 1.000+0.000 /−0.030 tolerance range) in an effort to make allowances for manufacturing variations, tool wear, cutting speed, etc. The NC machining apparatus, then, may be configured to machine the aircraft part 216 including its surface features and holes utilizing the NC machining program, which includes instructions to machine the surface features and holes to the nominal dimensions specified in the 3D geometry model for the aircraft part. In some examples, the NC machining apparatus may be a multi-axis NC machining apparatus configured to machine surface features and holes in each of two or more orthogonal planes in a single machining setup, such that holes and surfaces in a second orthogonal plane are not machined in a secondary machining operation on a second machining apparatus after NC machining holes and surfaces in a first orthogonal plane on a first machining apparatus.

The NC machining apparatus 206 may be any of a number of suitable apparatuses configured to hold appropriate material in place and machine the material into the aircraft part in accordance with the NC machining program 214. In some examples, the NC machining apparatus may be a single NC machining apparatus. In other examples, the NC machining apparatus may include an NC machining apparatus to rough the part out, and another, single NC machining apparatus to perform final or finish machining, such as to machine surface features that are flagged to each other in the 3D geometry model in a single set-up.

The NC machining apparatus may include an NC controller configured to direct the hole-forming tool 208 and/or surface machining tool 210 according to an appropriate NC machining program. Examples of suitable NC machining tools with appropriate surface machining tools include a milling machine, lathe, stamping machine and the like. Examples of suitable hole-forming tools include a drill, end mill, reamer, boring bar, hole punch and the like.

The NC machining apparatus 206 may utilize the hole-forming tool 208 for machining the holes. The hole-forming tool may be set at substantially the nominal hole diameter specified in the 3D geometry model for the part, instead of a dimension within the 2D drawing tolerance range that will allow for manufacturing variation and mitigate the risk of nonconformance, or a dimension at a high side of the hole-diameter tolerance range to allow for tool wear, whereby the holes are machined to substantially the nominal hole diameter specified in the 3D geometry model for the part. This may be accomplished by the NC machining program 214. In some examples, operator input to the NC machining apparatus 206 may be disabled to set the hole-forming tool with an offset value for machining the holes to a diameter that is shifted within the tolerance range to allow for manufacturing variations and mitigate the risk of nonconformance, or for machining the holes to a diameter toward the high side or a low side of the hole-diameter tolerance range to allow for tool wear. This may be accomplished in any of a number of different manners, such as through appropriate instructions in the NC machining program, which may protect the hole diameter corresponding to the nominal diameter in the 3D geometry model from being edited by the machinist or other operator.

The instructions of the NC machining program 214 may include instructions to machine the surface features of the aircraft part 216 to the nominal surface feature dimension.

The NC machining apparatus 206 may utilize the surface machining tool 210 for machining the surface features. Similar to the hole-forming tool 208, the surface machining tool may be set at substantially the nominal surface feature dimension, instead of a dimension within the 2D drawing tolerance range that will allow for manufacturing variation and mitigate the risk of nonconformance, or a dimension at a high side or a low side of the surface-feature tolerance range to allow for tool wear or reduce an amount of material removed, whereby the surface features are machined to substantially the nominal surface feature dimension specified in the 3D geometry model for the part. Again, this may be accomplished by the NC machining program. Also similar to the hole-forming tool, in some examples, operator input to the NC machining apparatus may be disabled to set the surface machining tool with an offset value for machining the surface features away from the nominal surface feature dimension in the 3D geometry model to a different diameter within the tolerance range to allow for manufacturing variations and mitigate the risk of nonconformance, or to a diameter toward the high side or low side of the surface-feature tolerance range to allow for tool wear or reduce the amount of material removed, such as again through appropriate instructions in the NC machining program, which may protect the surface feature dimension from being edited.

Further to the above, consider an example of an end mill for machining a part having a surface feature with a surface-feature tolerance range of +0.010/−0.003. The machinist may be inclined to set a tool offset at +0.005 inches, to adjust or shift the position of an end mill by +0.005 inches towards a high side of a tolerance range, when milling a datum edge or profile on the part. Manufacturing productivity could be improved through increased tool speed, etc., since less material is removed and more material is left on the resulting datum edge or surface, which nevertheless would remain in tolerance resulting in a part which will pass inspection. While this practice produces parts that fall within specified tolerances, it results in holes and other features dimensioned from the datum to be different from one part relative to another. This may be avoided in at least some example implementations by disabling operator input to the NC machining apparatus.

In some examples, the machined aircraft part 216 may be weighed and its weight compared to a baseline weight for the aircraft part with nominal dimensions. This may enable the model-based definition and machining system 200 to confirm that the surface features are machined to substantially to the nominal surface feature dimension specified in the 3D geometry model for the part, and that the holes are machined to substantially to the nominal hole diameter specified in the 3D geometry model for the part.

In some examples, the aircraft part 216, 3D geometry model 212 and NC machining program 214 may each be a first thereof. That is, the aircraft part may be a first aircraft part, the 3D geometry model may be a first 3D geometry model, and the NC machining program may be a first NC machining program. In these examples, the 3D geometry modeler 202 may also be configured to create a second 3D geometry model 212' for a second aircraft part having surface features and holes represented thereby. In this regard, the surface features of the first aircraft part and second aircraft part in respectively the first 3D geometry model and second 3D geometry model may have an identical mating surface feature profile. This may be accomplished in a number of different manners, such as by use of a common mating surface profile in the definition of both 3D geometry models 212, 212'.

The NC program generator 204 may also be configured to generate a second NC machining program 214' directly from the second 3D geometry model 212'. In some examples, the first and second NC machining programs 214, 214' may include instructions for the same tool path for machining the mating surface feature profile on both parts 216, 216'.

A single NC machining apparatus 206 may be configured to machine the second aircraft part 216' including its surface features and holes utilizing the second NC machining program 214'. Here, the NC machining apparatus that machines the second aircraft part may be the same NC machining apparatus that machines the first aircraft part (as shown), or they may be different NC machining apparatuses. The identical mating surface feature profile of the surface features of the first aircraft part 216 and second aircraft part, and the first NC machining program 214 and second NC machining program being generated directly from respectively the first 3D geometry model 212 and second 3D geometry model, may thereby enable the NC machining apparatus to machine respectively the first aircraft part and second aircraft part with a substantially identical mating surface feature profile. This may enable the assembly of the parts without any subsequent shimming or sanding operations.

In some examples, the holes of the second aircraft part in the second 3D geometry model 212' may be sized to a nominal hole diameter specified in the 3D geometry model for the second aircraft part. In these examples, the single NC machining apparatus 206 that machines the second aircraft part 216' may utilize the hole-forming tool 208 for machining the holes of the second aircraft part. Similar to the NC machining apparatus, the hole-forming tool that machines the holes of the second aircraft part may be the same hole-forming tool that machines the holes of the first aircraft part 216 (as shown), or they may be different hole-forming tools.

The hole-forming tool 208 may be set at substantially the nominal hole diameter of the holes specified in the 3D geometry model for the second aircraft part 216', whereby the holes of the second aircraft part may be machined to substantially the nominal hole diameter in the 3D geometry models thereof. In some examples, the nominal hole diameter specified in the 3D geometry models is the diameter substantially to which the holes of the first aircraft part 216 and second aircraft part are machined may be the same and a final hole size for a class hole diameter corresponding to a fastener. This may enable installation of fasteners to assemble the first aircraft part and second aircraft part without any subsequent drilling, reaming or shimming operations. Examples of suitable types of fasteners include externally-threaded bolts or screws, rivets, pins or the like.

In one example implementation, the aircraft part 216, 3D geometry model 212 and NC machining program 214 are a first aircraft part, a first 3D geometry model, and a first NC machining program, and 3D geometry modeler 202 is configured to create plurality of 3D geometry models for a plurality of parts to be assembled with the first part. Accordingly, in one example implementation, a method is provided for manufacturing aircraft parts for an assembly, which comprises creating a first NC machining program 214 for a first aircraft part based on a first created 3D geometry model, wherein a plurality of additional 3D geometry models with holes and surface features at nominal dimensions are created for a plurality of parts to be assembled with the first part into an assembly. As such, the method comprises creating a plurality of 3D geometry models for a plurality of parts to be assembled with the first part, wherein the NC machining programs for machining each part are created from each of the plurality of 3D geometry models that each include identical surface feature profiles for respective mating surfaces, such that the plurality of parts are NC machined based on 3D geometry models having identical surface feature profiles so as to produce a plurality of parts with substantially identical mating surface profiles.

In the above example implementation, the method may further comprise the step of creating a set of 3D geometry models with holes and surface features at nominal dimensions for a plurality of parts to be assembled with the first part, with each of the 3D geometry models including identical surface feature profiles for respective mating surfaces, and the step of machining each of the plurality of parts to be assembled with the first part using NC machining programs that are each created based on the 3D geometry model for each respective part, such that each of the plurality of individual parts are machined to have substantially identical mating surfaces based on the set of 3D geometry models that include identical surface feature profiles for respective mating surfaces of the respective mating parts.

In the above example implementation, the method may further comprise the step of creating a set of 3D geometry models with holes and surface features at nominal dimensions for a plurality of parts to be assembled with the first part, with each of the 3D geometry models including identical surface feature profiles for respective mating surfaces, and the step of sending individual 3D geometry models to different individual manufacturing facilities for creating NC machining programs based on 3D geometry models having identical surface feature profiles. Thus, the method functions so as to machine a plurality of individual parts at a number of different manufacturing facilities to have substantially identical mating surface profiles based on the set of 3D geometry models that include identical surface feature profiles for respective mating surfaces of the respective mating parts.

In the example implementation, the method includes a subset of the plurality of parts being machined at different manufacturing facilities that each have a numerically controlled machining apparatus, instead of machining all of the parts at the same manufacturing facility. Accordingly, the method further comprises the steps of creating a set of 3D geometry models with holes and surface features at nominal dimensions for a plurality of parts to be assembled with the first part, with each of the 3D geometry models including identical surface feature profiles for respective mating surfaces, and sending individual 3D geometry models to different individual manufacturing facilities for creating NC machining programs based on 3D geometry models having identical surface feature profiles, so as to machine a plurality of individual parts at a number of different manufacturing facilities to have substantially identical mating surfaces based on the set of 3D geometry models that include identical surface feature profiles for respective mating surfaces of the respective mating parts. In the example implementation, the method also entails machining the parts to be NC machined at a substantially consistent temperature that is effective to consistently machine the holes and surfaces of each part to nominal dimensions at a plurality of different individual manufacturing facilities, such that the plurality of parts are NC machined based on 3D geometry models having identical surface feature profiles so as to have substantially identical mating surfaces without thermal expansion due to different temperatures affecting dimensions of the holes and surfaces machined. Likewise, each of the parts to be machined may be supported on a fixture to inhibit deflection of the part during machining holes and surfaces to nominal dimensions, where the part may be an elongate frame section having end portions that may deflect as a result of the part's elasticity, weight, length, etc.

Figure 3:
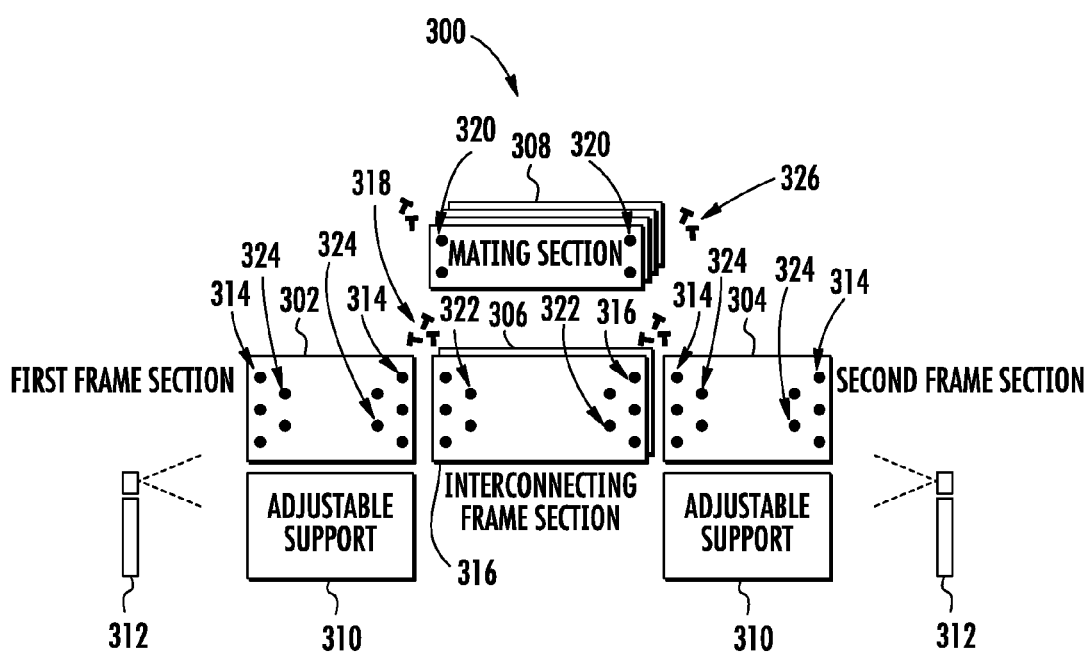
FIG. 3 illustrates a component assembly system, according to some example implementations.

FIG. 3 illustrates a component assembly system 300 that in some examples may correspond to the component assembly subsystem 104 of FIG. 1. As indicated above and explained in greater detail below, the component assembly system may facilitate assembly of an aircraft structure assembly without use of any shimming, locating fixtures or final-hole-size drill jigs. In accordance with example implementations, the aircraft assembly may be composed of a plurality of sections including first and second frame sections 302, 304, an interconnecting frame section 306 and a plurality of structural mating sections 308. In some examples, at least two of these sections 302-308 may be NC machined such as by a model-based definition and machining subsystem 102, 200 based on respective 3D geometry models thereof. And in these examples, the sections in the respective 3D models may have an identical mating surface feature profile such that the sections may be machined to have a substantially identical mating surface feature profile.

As shown in FIG. 3, the component assembly system 300 may include one or more of each of a number of components, such as adjustable supports 310 and a laser metrology system 312. The first and second frame sections 302, 304 may be supported on respective adjustable supports positioned to align the first and second frame sections in a spaced-apart relationship. In some examples, the laser metrology system 312 may be used to position the adjustable supports at baseline positions for positioning and aligning the first and second frame sections in the spaced-apart relationship.

The interconnecting frame section 306 may be positioned between the first and second frame sections 302, 304. As explained in greater detail below, in some examples, the first and second frame sections may be respectively leading edge and aft frame sections, and the interconnecting frame section may include inner and outer span-wise sections. In these examples, the inner and outer span-wise sections of the interconnecting frame section may be positioned between the leading edge and aft frame sections without use of any shimming, locating fixtures or final-hole-size drill jigs.

More particularly to the laser metrology system 312, for example, the first and second frame sections 302, 304 may include first pre-drilled mating holes 314 that may be self-aligning with one another, as well as with first pre-drilled holes 316 in the interconnecting frame section 306. The laser metrology system may then be used to position the adjustable supports 310 and hence the first and second frame sections in their spaced-apart relationship such that their first pre-drilled holes may align, and thereby ease subsequent alignment with the first pre-drilled holes in the interconnecting frame section. Notably, however, the adjustable supports are not required to locate the respective first and second frame sections or any of their features, but simply to support the first and second frame sections for ease of assembly. The frame sections may locate themselves such as by the pre-drilled holes, and perhaps one or more other holes, surface features or the like. In some examples, the adjustable supports may be positioned at baseline positions for positioning and aligning the first and second frame sections in the spaced-apart relationship, at a predetermined distance from each other corresponding to the length of an interconnecting frame section to be installed between the first and second frame sections. Notably, each of the first and second frame sections may be adjusted by the adjustable supports to position the spaced-apart sections at the predetermined distance and appropriate alignment, and to account for deflection that may occur where the section or part is an elongate section having end portions that experience minimal deflection as a result of the part's elasticity, weight, length, etc.

An operator may align first pre-drilled mating holes 316 in the interconnecting frame section 306 with first pre-drilled mating holes 314 in the first and second frame sections 302, 304, and install fasteners 318 (e.g., externally-threaded screw or bolt, rivet, pin) through the aligned, first pre-drilled mating holes. For each structural mating section 308 of a plurality of structural mating sections, the structural mating section may be positioned relative to the first and second frame sections and interconnecting frame section. The operator may align second pre-drilled mating holes 320 in the structural mating section with second pre-drilled mating holes 322, 324 in at least one of the interconnecting frame section, first frame section or second frame section, and install fasteners 326 (e.g., externally-threaded screw or bolt, rivet, pin) through the aligned, second pre-drilled mating holes to secure the structural mating section. In some examples, the structural mating section may be positioned, the second pre-drilled mating holes may be aligned and fasteners may be installed through the aligned, second pre-drilled mating holes, for the plurality of structural mating sections to assemble the aircraft structure assembly inwardly from the first and second frame sections that form an outer perimeter structure thereof.

In one example, first pre-drilled mating holes 314, 316 may be pre-drilled prior to their alignment, and pre-drilled to substantially a nominal hole diameter that is a final hole size for a class hole diameter corresponding to a fastener 318. Similarly, in some examples, second pre-drilled mating holes 320-324 may be pre-drilled prior to their alignment, and pre-drilled to substantially a nominal hole diameter that is a final hole size for a class hole diameter corresponding to a fastener 326. In these examples, the fasteners may be inserted through the aligned, first pre-drilled mating holes without use of locating fixtures for positioning and securing the interconnecting frame section 306 and first and second frame sections 302, 304 relative to each other. Additionally or alternatively, the fasteners may be inserted through the aligned, second pre-drilled mating holes without use of locating fixtures for positioning and securing the structural mating section 308 and the interconnecting frame section, first frame section and/or second frame section relative to each other.

In one example implementation, a method of assembling an aircraft structure assembly further comprises the step of NC machining at least two of the sections based on respective 3D geometry models thereof, the at least two of the sections in the respective 3D models having an identical mating surface feature profile such that the at least two of the sections are machined to have a substantially identical mating surface feature profile. The method may further include the step of creating a set of 3D geometry models, having holes and surface features at nominal dimensions, for a plurality of parts to be assembled, with each of the 3D geometry models including identical surface feature profiles for respective mating surfaces. The method further includes the step of machining each of the plurality of parts to be assembled using NC machining programs that are each created based on the 3D geometry model for each respective part, such that each of the plurality of individual parts are machined to have substantially identical mating surfaces based on the set of 3D geometry models that include identical surface feature profiles for respective mating surfaces of the respective mating parts.

The method may further comprise the step of sending individual 3D geometry models from the set to different individual manufacturing facilities for creating NC machining programs based on the 3D geometry models having identical surface feature profiles. Thus, the method functions so as to machine a plurality of individual parts at a number of different manufacturing facilities to have substantially identical mating surface profiles based on the set of 3D geometry models that include identical surface feature profiles for respective mating surfaces of the respective mating parts.

Accordingly, an example method of assembling an aircraft structure assembly may comprise assembling first and second frame sections with an interconnecting section and other internally connecting sections, wherein a plurality of the individual frame section parts are machined at a number of different manufacturing facilities to have substantially identical mating surface profiles based on the set of 3D geometry models that include identical surface feature profiles for respective mating surfaces of the respective mating parts, instead of machining all of the frame section parts at the same manufacturing facility. In the example method, a plurality of holes are machined in each of the first and second frame sections, interconnecting section and other internally connecting sections, to a nominal dimension for a final hole size for a class hole diameter corresponding to a fastener, wherein the individual frame section parts are machined at a number of different manufacturing facilities, using NC machining programs based on the set of 3D geometry models, to machine hole diameters and locations at substantially nominal dimensions for each of the parts and/or sections. Instead of machining or drilling all the holes for two or mating parts to a final hole size at the same manufacturing facility to ensure that the holes are aligned and drilled to a fastener size (e.g., using a final-hole-size drill jig for drilling holes in a secondary machining operation after NC machining of the parts), a subset of the set of 3D geometry models are sent to different individual manufacturing facilities for creating NC machining programs based on the 3D geometry models to machine a plurality of individual parts at a number of different manufacturing facilities, where the parts and/or frame sections were pre-drilled to nominal dimensions for a final hole size corresponding to a fastener at a number of different manufacturing facilities. Even though the holes for the plurality of parts or frame sections were pre-drilled at a number of different manufacturing facilities, because the parts were machined using NC machining programs based on the sets of 3D geometry models to machine and pre-drill holes to nominal size and location dimensions on a single numerically controlled machining apparatus (without any secondary operation for fixturing parts and drilling holes), the NC-machined pre-drilled holes with diameters and locations at nominal dimensions enable the plurality of frame sections to be assembled by aligning pre-drilled mating holes in corresponding parts and inserting fasteners through the aligned pre-drilled mating holes without using locating fixtures for positioning and securing the frame sections relative to each other or drill jigs for drilling holes to final hole size at the time of assembly.

FIGS. 4-14 illustrate a portion of a component assembly system 400 that in some example may correspond to the component assembly system 300 of FIG. 3, and which may be useful for assembling an aircraft structure without use of any locating fixtures for alignment of the sections or final-hole-size drill jigs for drilling holes. The component assembly system is shown as being useful for assembling an aircraft wing assembly, but it should be understood that the component assembly system may be useful for assembling any of a number of different aircraft structures. As shown in FIGS. 6-14, the aircraft wing assembly may be composed of a plurality of sections including, for example, leading edge and aft frame sections 602, 604, inner and outer span-wise sections 702, 704, and a plurality of internal structural members 902 including a main spar 902', which may be assembled inwardly from an outer perimeter structure including the frame sections and span-wise sections.

Figure 4:
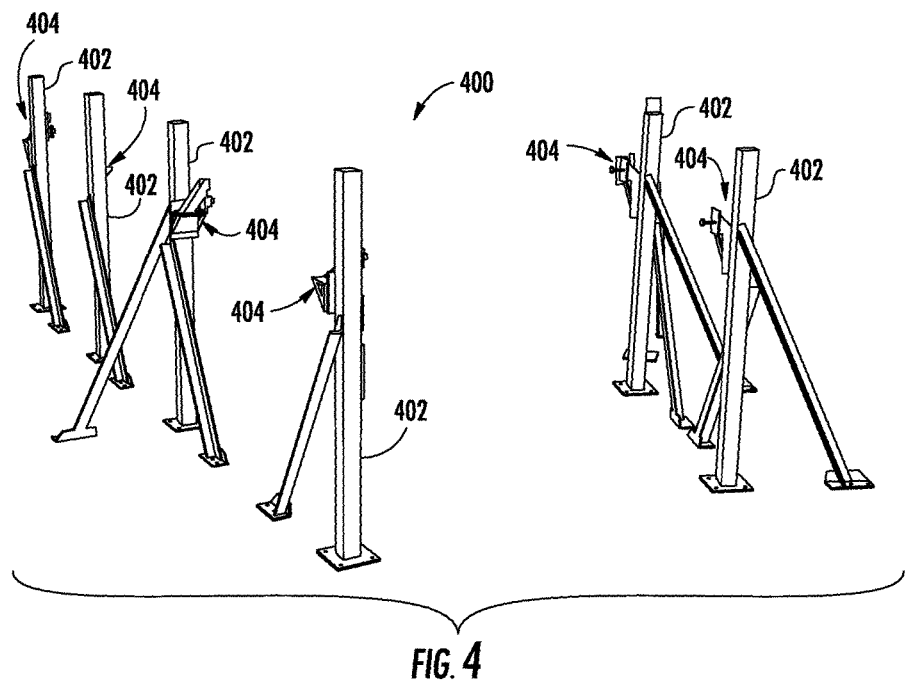
FIGS. 4-14 illustrate a portion of a component assembly system, and which may be useful for assembling an aircraft structure without use of any locating fixtures for alignment of the sections or final-hole-size drill jigs for drilling holes, according to some example implementations.
Figure 5:
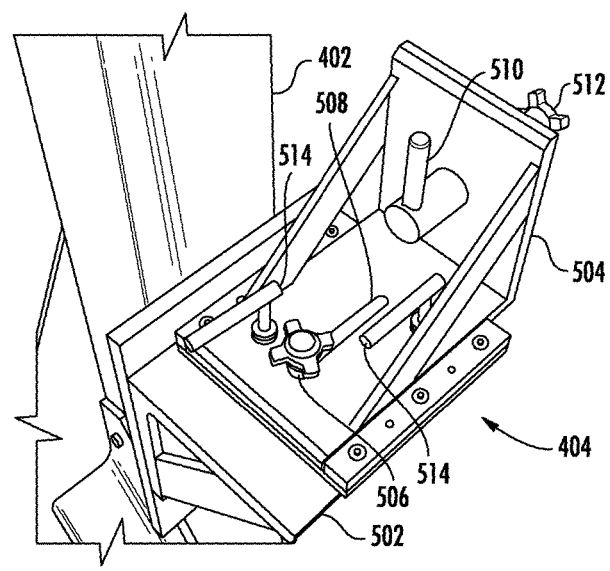

As shown in FIG. 4 and more particularly in FIG. 5, the system may include adjustable supports 402 each of which includes an adjustable support bracket 404. The adjustable support bracket may include a base 502 on which a brace 504 may be adjustably secured, such as by a star wheel 506 through an elongated opening 508 defined in the brace. The support bracket may also include a pin 510 and star wheel 512 to attach a section of the aircraft structure to the adjustable support. The support bracket may also include one or more nominal position pins 514 for verification of assembly accuracy if so desired. The support bracket may be slid to accommodate part insertion onto the assembly or accommodate tolerance growth of the assembly if necessary.

Figure 6:
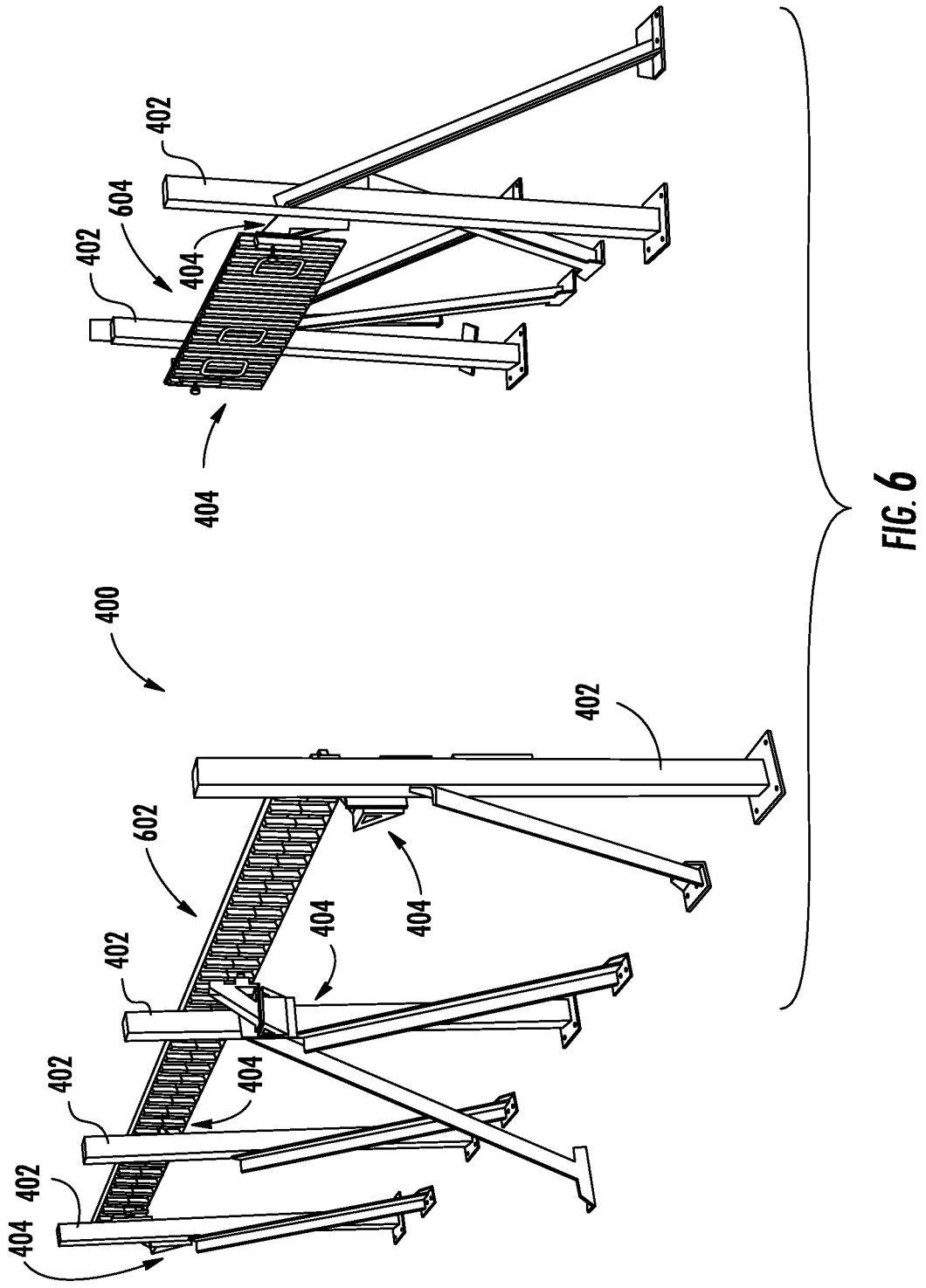

As shown in FIG. 6, the adjustable supports 402 may support the leading edge and aft frame sections 602, 604, and may be positioned to align the leading edge and aft frame sections in a spaced-apart relationship. In some examples, the adjustable supports may be positioned at baseline positions for positioning and aligning the leading edge and aft frame sections in the spaced-apart relationship, at a predetermined distance from each other corresponding to the length of an interconnecting frame section to be installed between the leading edge and aft frame sections. Notably, each of the leading edge and aft frame sections may be adjusted by the adjustable supports 402 to position the spaced-apart sections at the predetermined distance and appropriate alignment, and to account for deflection that may occur where the section or part is an elongate section having end portions that experience minimal deflection as a result of the part's elasticity, weight, length, etc. This may be accomplished, for example, using a laser metrology system (e.g., laser metrology system 312) of the component assembly system 400.

Figure 7:
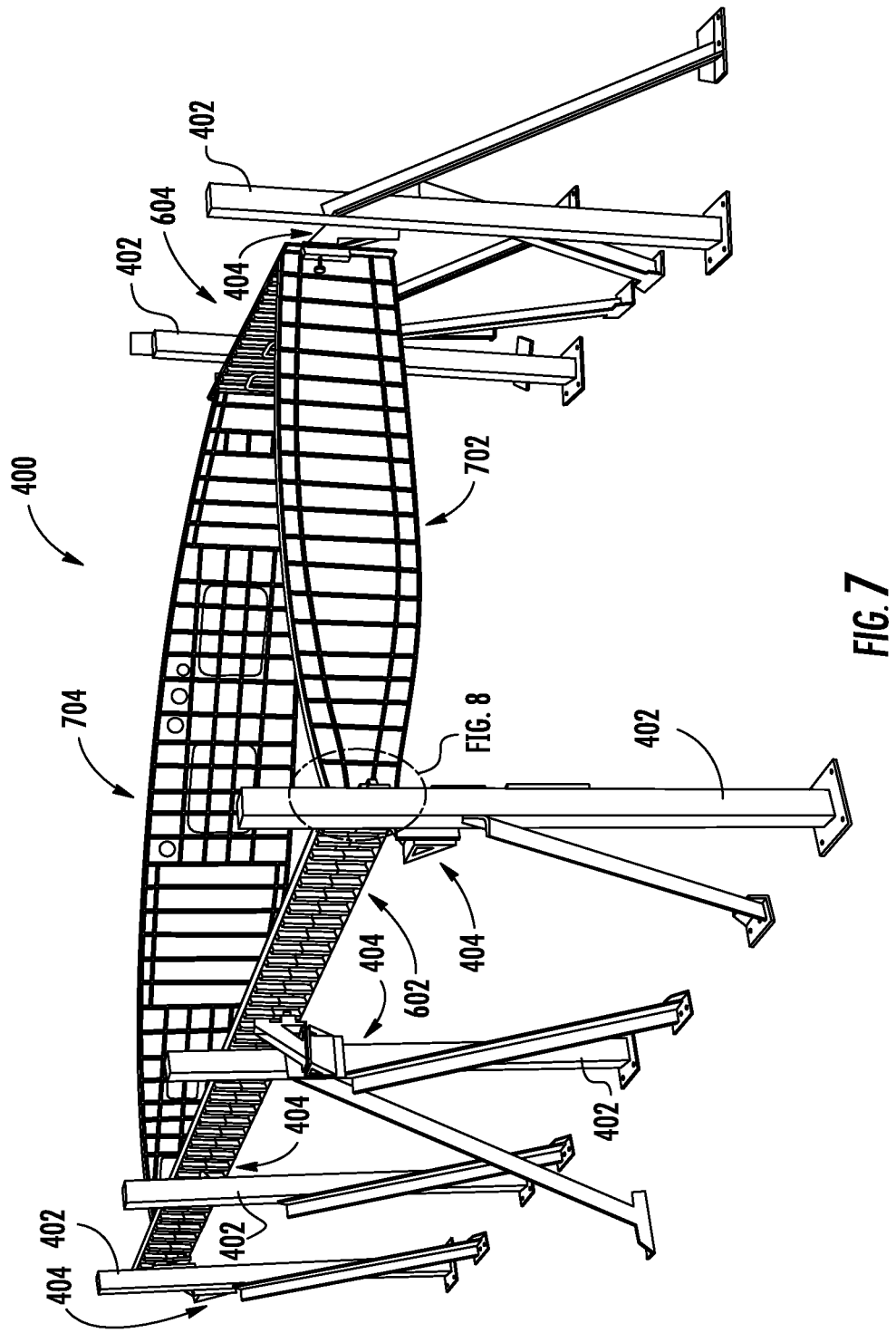
Figure 8:
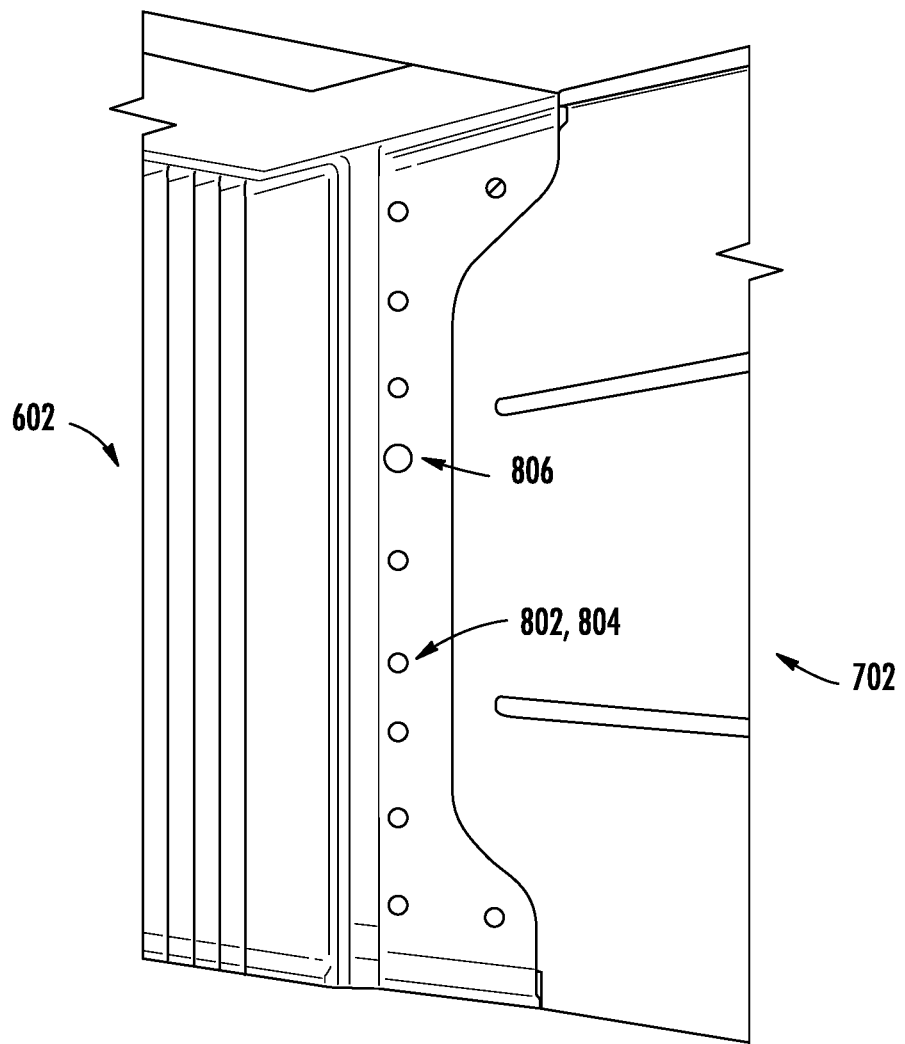

As shown in FIG. 7, the inner and outer span-wise sections 702, 704 may be positioned between the leading edge and aft frame sections. First pre-drilled mating holes in the inner and outer span-wise sections may be aligned with first pre-drilled mating holes in the leading edge and aft frame sections, and fasteners may be installed through the aligned, first pre-drilled mating holes, to thereby form an outer perimeter structure of the aircraft wing assembly. As indicated in FIG. 7, this is shown in FIG. 8 for alignment of first pre-drilled mating holes 802 in the inner span-wise section 702, and first pre-drilled mating holes 804 in the leading edge frame section 602, for installation of fasteners 806. In FIG. 8, only one pair of aligned holes is called out, and only one fastener is shown, for purposes of illustration.

Figure 9:
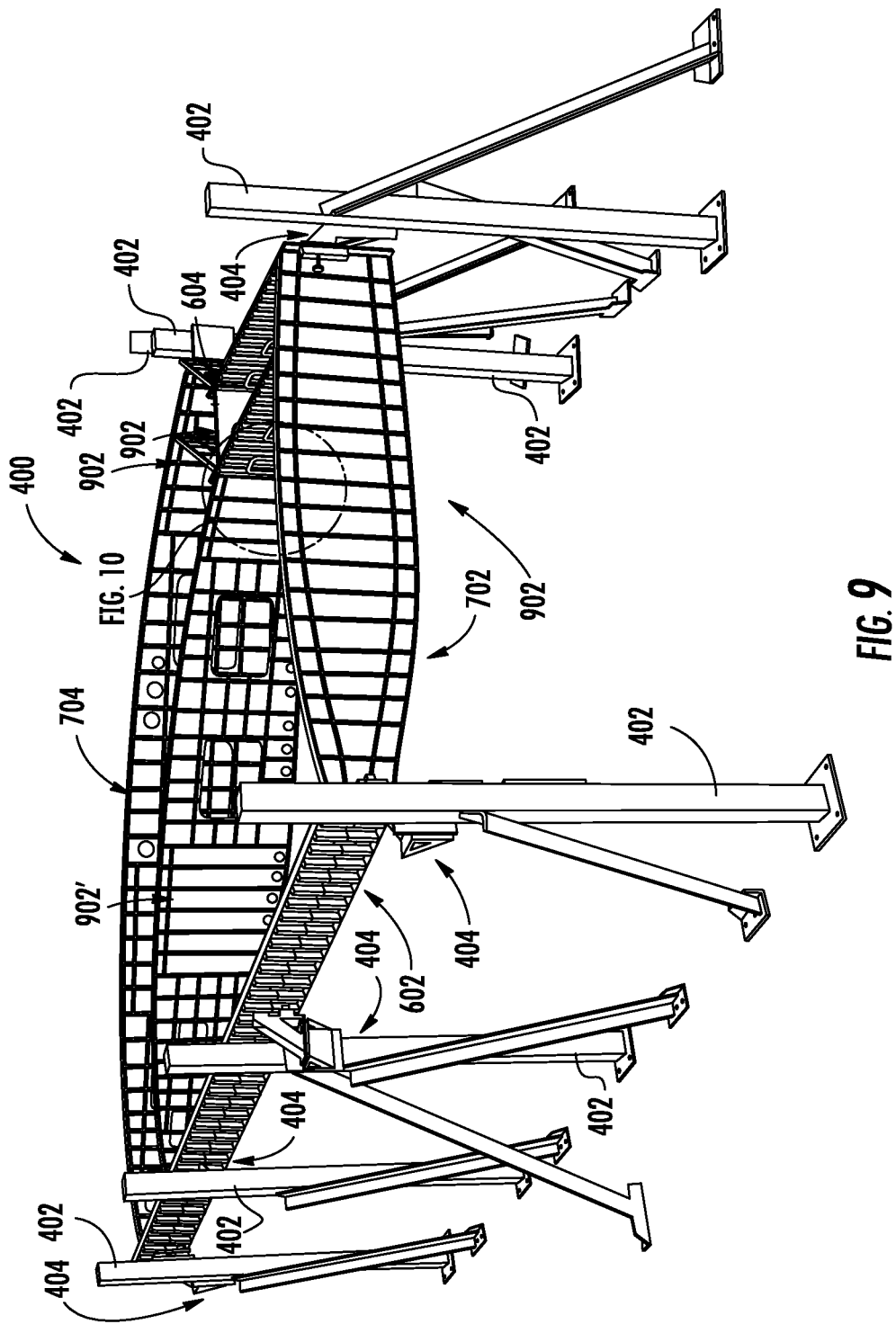
Figure 10:
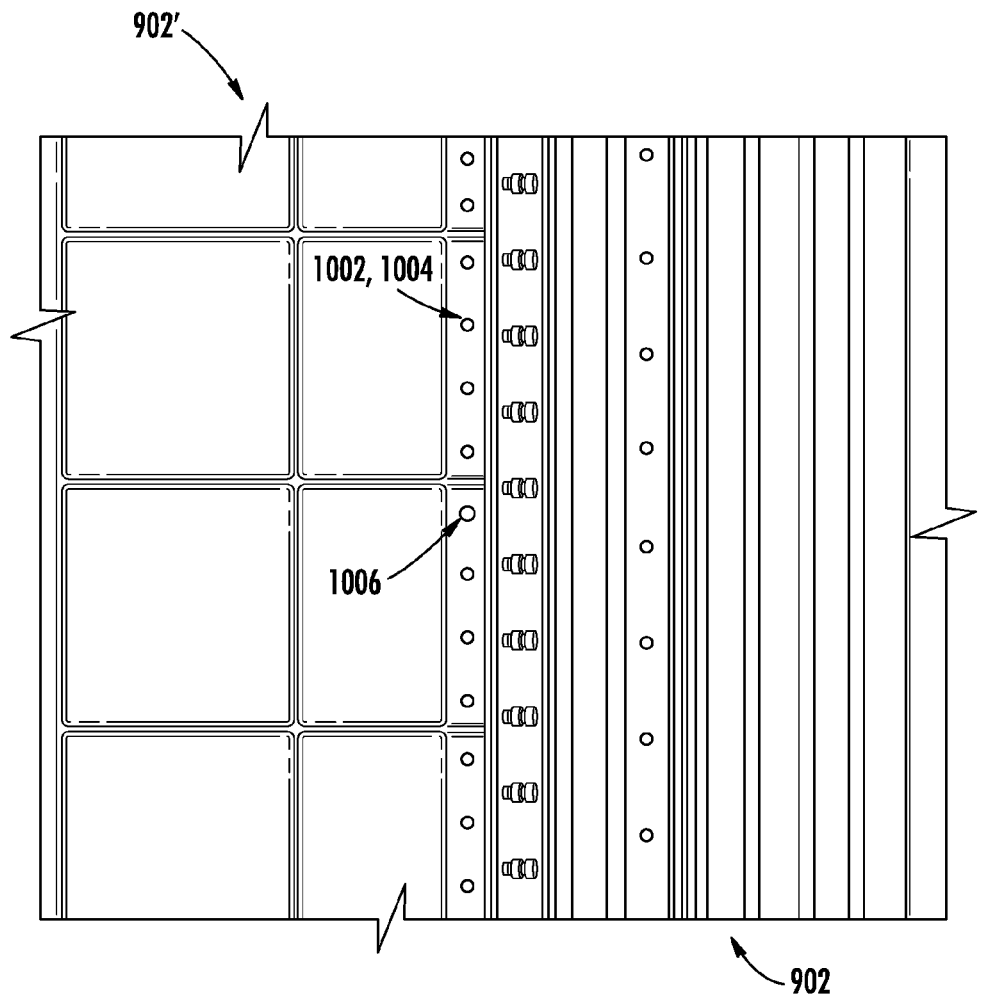

As shown in FIGS. 9-12, for each internal structural member 902 of the plurality of internal structural members, the internal structural member may be positioned within the outer perimeter structure (including the leading edge and aft frame sections 602, 604, and the inner and outer span-wise sections 702, 704). Second pre-drilled mating holes in the internal structural member may be aligned with second pre-drilled mating holes in at least one of another internal structural member, the inner span-wise section or outer span-wise section, and fasteners may be installed through the aligned, second pre-drilled aligned holes to secure the internal structural member. As indicated in FIG. 9, this is shown more particularly in FIG. 10 for alignment of second pre-drilled mating holes 1002 in the main spar 902', and second pre-drilled mating holes 1004 in another internal structural member, for installation of fasteners 1006. In FIG. 10, only one pair of aligned holes is called out, and only one fastener is shown, for purposes of illustration.

Figure 11:
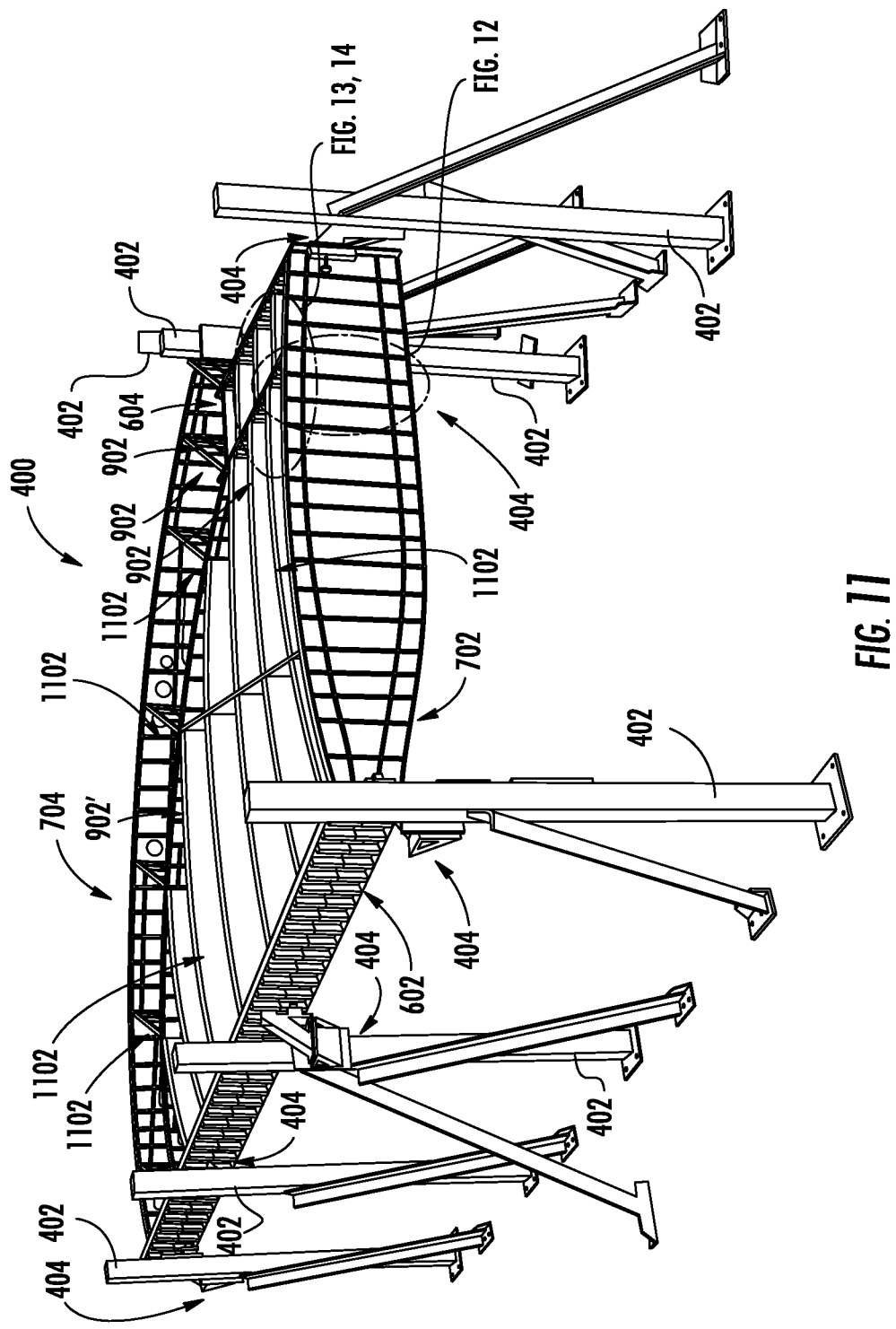
Figure 12:
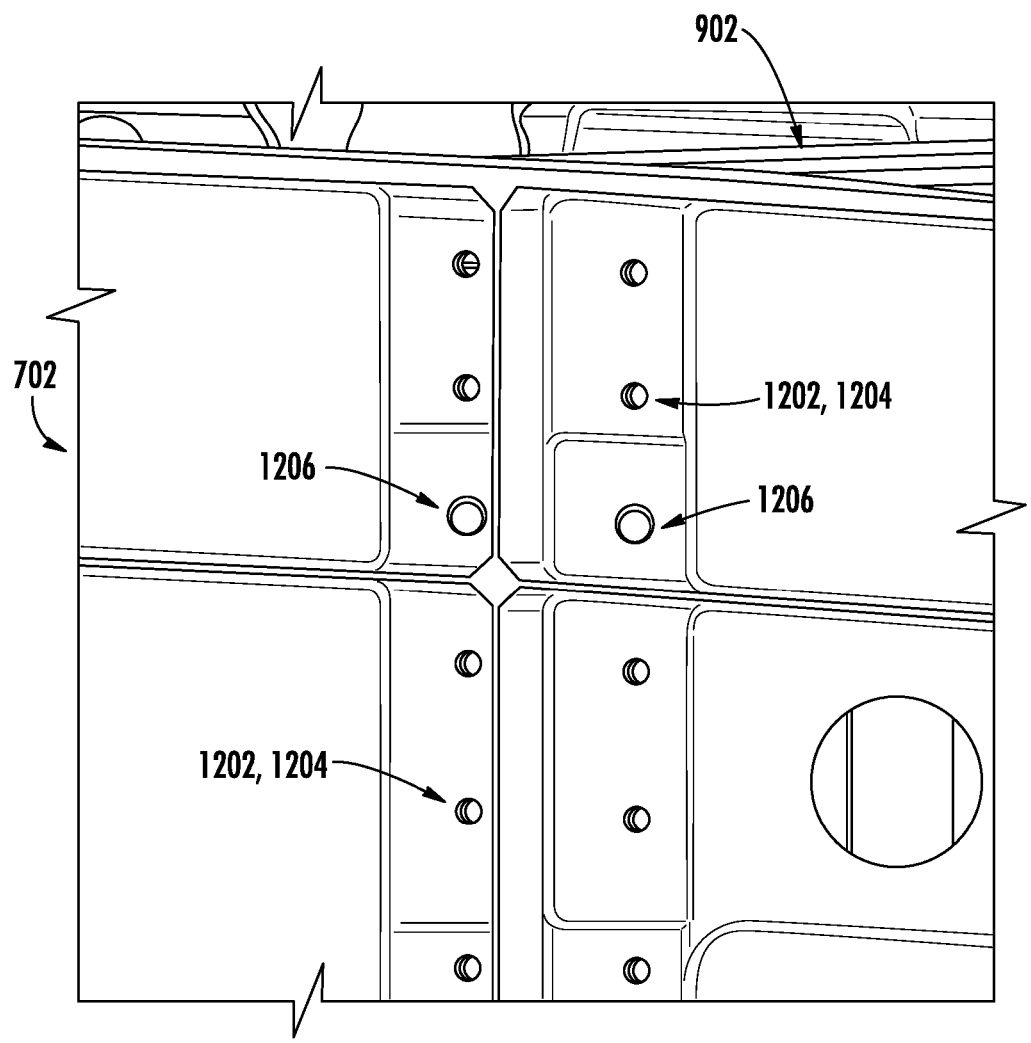

FIG. 11 illustrates additional internal structural members 1102 (only some of which are called out) secured to the outer perimeter structure; and as indicated, FIG. 12 illustrates alignment of second pre-drilled mating holes 1202 in an internal structural member with second pre-drilled mating holes 1204 in the inner span-wise section 702, for installation of fasteners 1206. In FIG. 12, only two pairs of aligned holes are called out, and only two fasteners are shown, for purposes of illustration.

Figure 13:
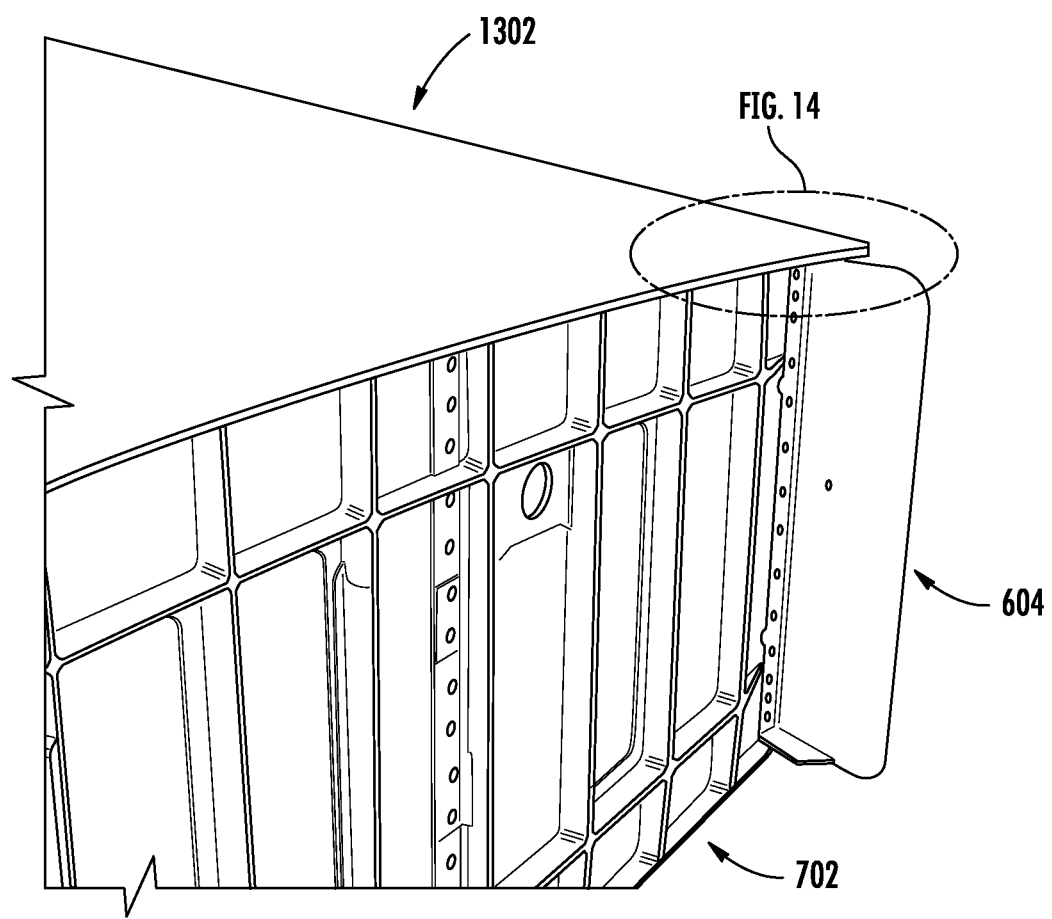
Figure 14:
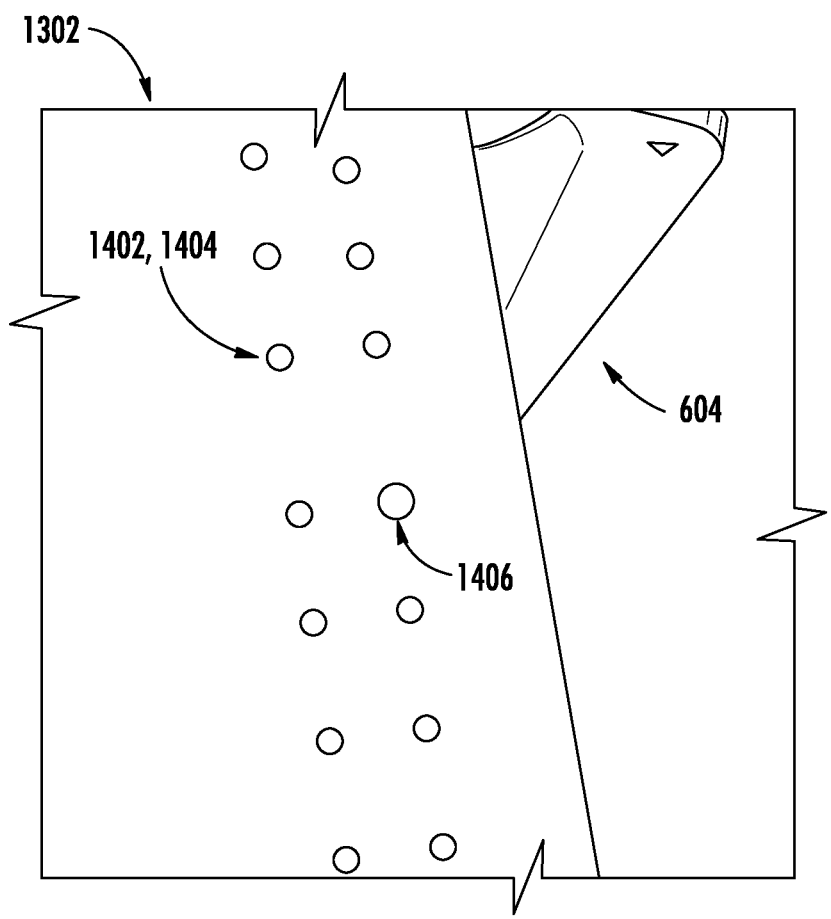

As shown in FIG. 13, in some examples, the aircraft wing assembly may be further composed of one or more outer skin portions 1302. In these examples, and again without use of any locating fixtures or final-hole-size drill jigs, the outer skin portions may be positioned relative to the outer perimeter structure. Third pre-drilled mating holes in the outer skin portion(s) may be aligned with third pre-drilled mating holes in the outer perimeter structure, and fasteners may be installed through the aligned, third pre-drilled mating holes to secure the skin portions. This is shown more particularly in FIG. 14, for example, for alignment of third pre-drilled mating holes 1402 in an outer skin portion, and third pre-drilled mating holes 1404 in the inner span-wise section 702, for installation of fasteners 1406. Once again, in FIG. 14, only one pair of aligned holes is called out, and only one fastener is shown, for purposes of illustration.

Accordingly, an example method of assembling an aircraft structure assembly may comprise assembling inner and outer span-wise sections 702, 704 with leading edge and aft frame sections 602, 604, wherein a plurality of the individual frame section parts are machined at a number of different manufacturing facilities to have substantially identical mating surface profiles based on a set of 3D geometry models that include identical surface feature profiles for respective mating surfaces of the respective mating sections, instead of machining all of the section or parts at the same manufacturing facility. In the example method, a plurality of holes are machined in each of the inner and outer span-wise sections 702, 704 and leading edge and aft frame sections 602, 604, to a nominal dimension for a final hole size for a class hole diameter corresponding to a fastener, wherein the individual sections are machined at a number of different manufacturing facilities, using NC machining programs based on the set of 3D geometry models, to machine hole diameters and locations at substantially nominal dimensions for each of the sections. Instead of machining or drilling all the holes for two or mating parts to a final hole size at the same manufacturing facility to ensure that the holes are aligned and drilled to a fastener size (e.g., using a final-hole-size drill jig for drilling holes in a secondary machining operation after NC machining of the parts), the plurality of sections were pre-drilled to nominal dimensions for a final hole size corresponding to a fastener at a number of different manufacturing facilities. Even though the holes for the plurality of sections were pre-drilled at a number of different manufacturing facilities, because the sections were machined using NC machining programs based on the sets of 3D geometry models to machine and pre-drill holes to nominal size and location dimensions on a single numerically controlled machining apparatus (without any secondary operation for fixturing parts and drilling holes), the NC-machined pre-drilled holes with diameters and locations at nominal dimensions enable the plurality of frame sections to be assembled by aligning pre-drilled mating holes in corresponding sections and inserting fasteners through the aligned pre-drilled mating holes, without using locating fixtures for positioning and securing the frame sections relative to each other or drill jigs for drilling holes to final hole size at the time of assembly.

Figure 15:
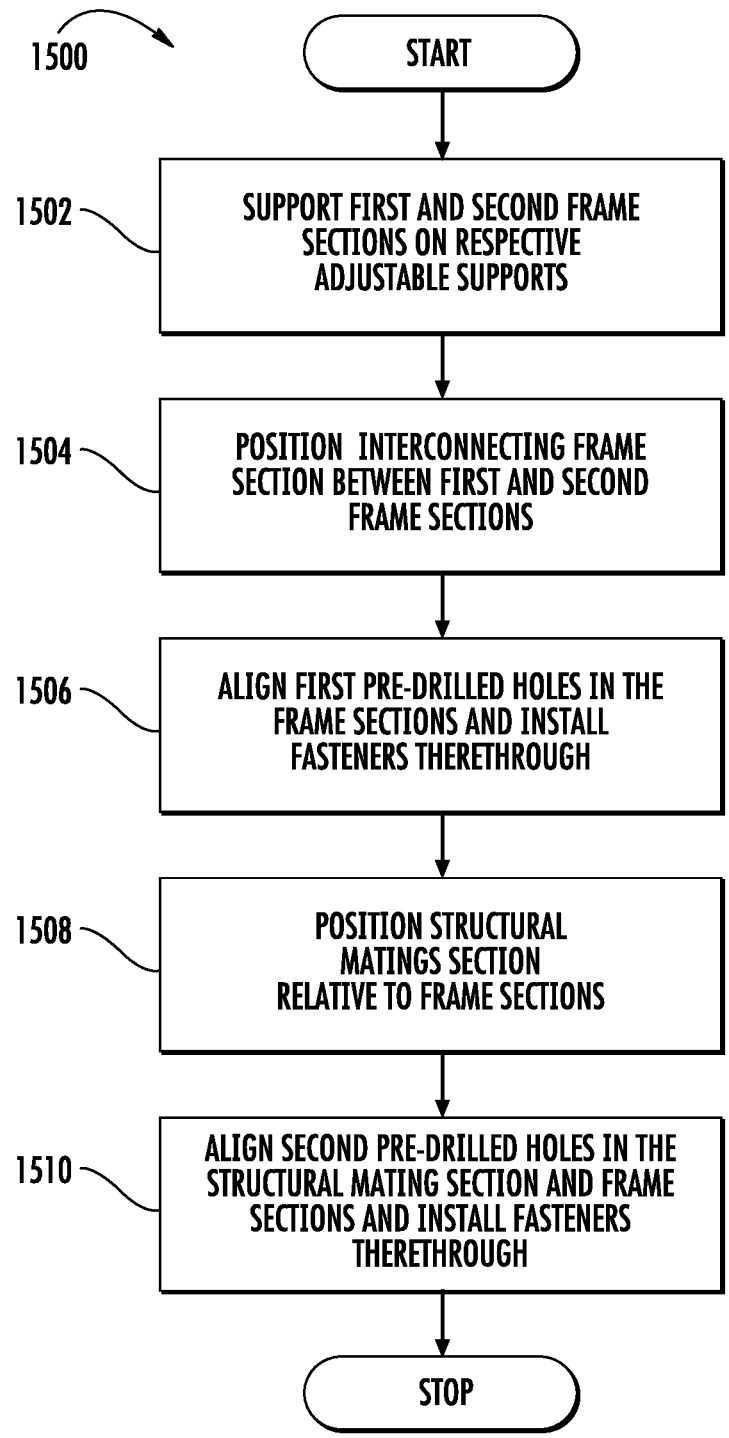
FIGS. 15 and 16 are flowcharts illustrating various steps in methods for respectively assembling an aircraft structure assembly and assembling an aircraft wing assembly, according to some example implementations.

FIG. 15 is a flowchart illustrating various steps in a method 1500 of assembling an aircraft structure assembly without use of any shimming, locating fixtures or final-hole-size drill jigs, according to some example implementations. The aircraft structure assembly is composed of a plurality of sections including first and second frame sections, an interconnecting frame section and a plurality of structural mating sections. As shown at blocks 1502, 1504, the method may include supporting the first and second frame sections on respective adjustable supports positioned to align the first and second frame sections in a spaced-apart relationship, and positioning the interconnecting frame section between the first and second frame sections. The method may include aligning first pre-drilled mating holes in the interconnecting frame section with first pre-drilled mating holes in the first and second frame sections, and installing fasteners through the aligned, first pre-drilled mating holes, as shown at block 1506. For each structural mating section of a plurality of structural mating sections, the method may include positioning the structural mating section relative to the first and second frame sections and interconnecting frame section, as shown at block 1508. And for each structural mating section of a plurality of structural mating sections, the method may include aligning second pre-drilled mating holes in the structural mating section with second pre-drilled mating holes in at least one of the interconnecting frame section, first frame section or second frame section, and installing fasteners through the aligned, second pre-drilled mating holes to secure the structural mating section, as shown at block 1510.

Figure 16:
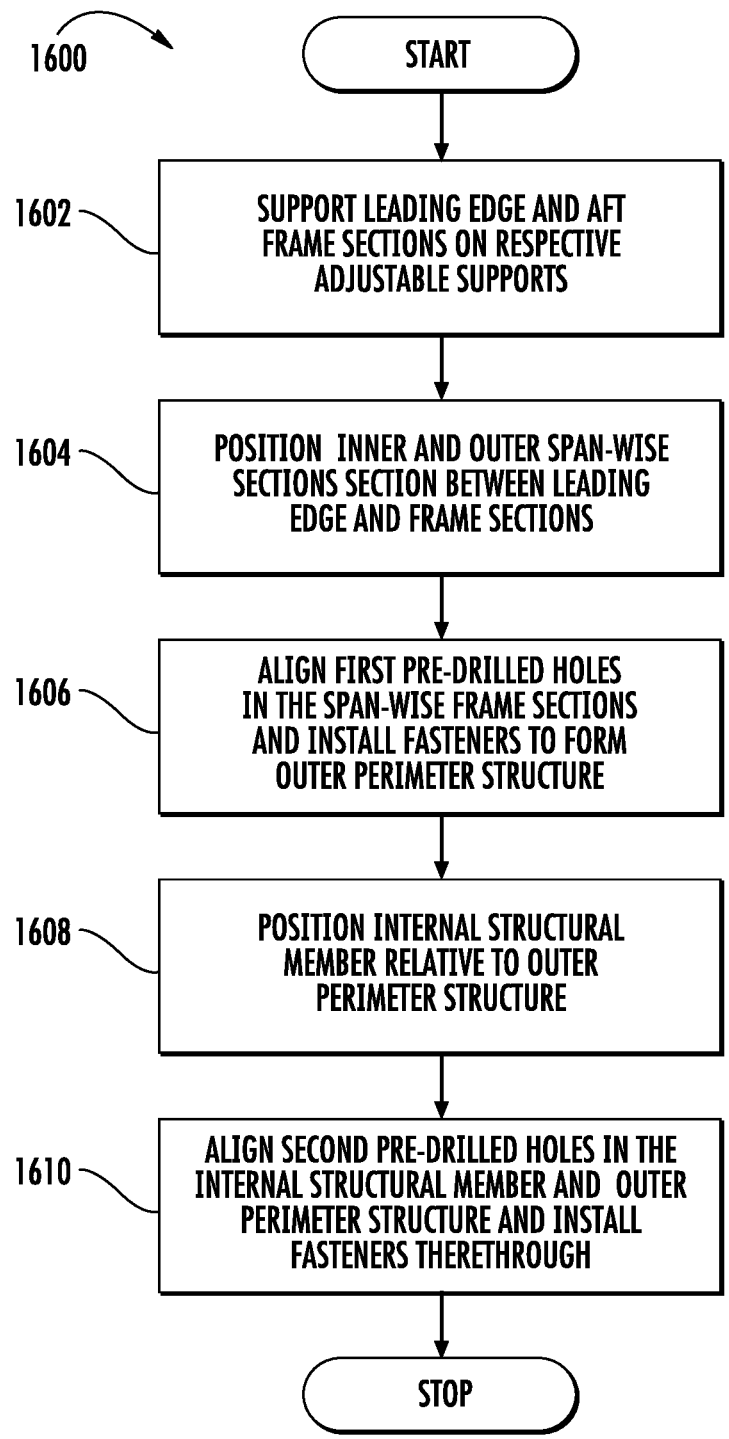

FIG. 16 is a flowchart illustrating various steps in a method 1600 of assembling an aircraft wing assembly without use of any locating fixtures for alignment of the sections or final-hole-size drill jigs for drilling holes, according to some example implementations. The aircraft wing assembly is composed of a plurality of sections including leading edge and aft frame sections, inner and outer span-wise sections and a plurality of internal structural members. As shown at blocks 1602, 1604, the method may include supporting the leading edge and aft frame sections on respective adjustable supports positioned to align the leading edge and aft frame sections in a spaced-apart relationship, and positioning the inner and outer span-wise sections between the leading edge and aft frame sections. The method may include aligning first pre-drilled mating holes in the inner and outer span-wise sections with first pre-drilled mating holes in the leading edge and aft frame sections, and installing fasteners through the aligned, first pre-drilled mating holes, to thereby form an outer perimeter structure of the aircraft wing assembly, as shown at block 1606. For each internal structural member of the plurality of internal structural members, the method may include positioning the internal structural member within the outer perimeter structure, as shown at block 1608. And for each internal structural member of the plurality of internal structural members, the method may include aligning second pre-drilled mating holes in the internal structural member with second pre-drilled mating holes in at least one of another internal structural member, the inner span-wise section or outer span-wise section, and installing fasteners through the aligned, second pre-drilled aligned holes to secure the internal structural member, as shown at block 1610. The aircraft wing assembly may be assembled inwardly from the outer perimeter structure.

According to example implementations of the present disclosure, the model-based definition and machining subsystem 102, and the example model-based definition and machining subsystem 200 and its subsystems including the 3D geometry modeler 202 and/or NC program generator 204 may be implemented by various means. Means for implementing the model-based definition and machining subsystem and its subsystems may include hardware, alone or under direction of one or more computer programs from a computer-readable storage medium. In some examples, one or more apparatuses may be configured to function as or otherwise implement the model-based definition and machining subsystem and its subsystems shown and described herein. In examples involving more than one apparatus, the respective apparatuses may be connected to or otherwise in communication with one another in a number of different manners, such as directly or indirectly via a wired or wireless network or the like.

Figure 17:
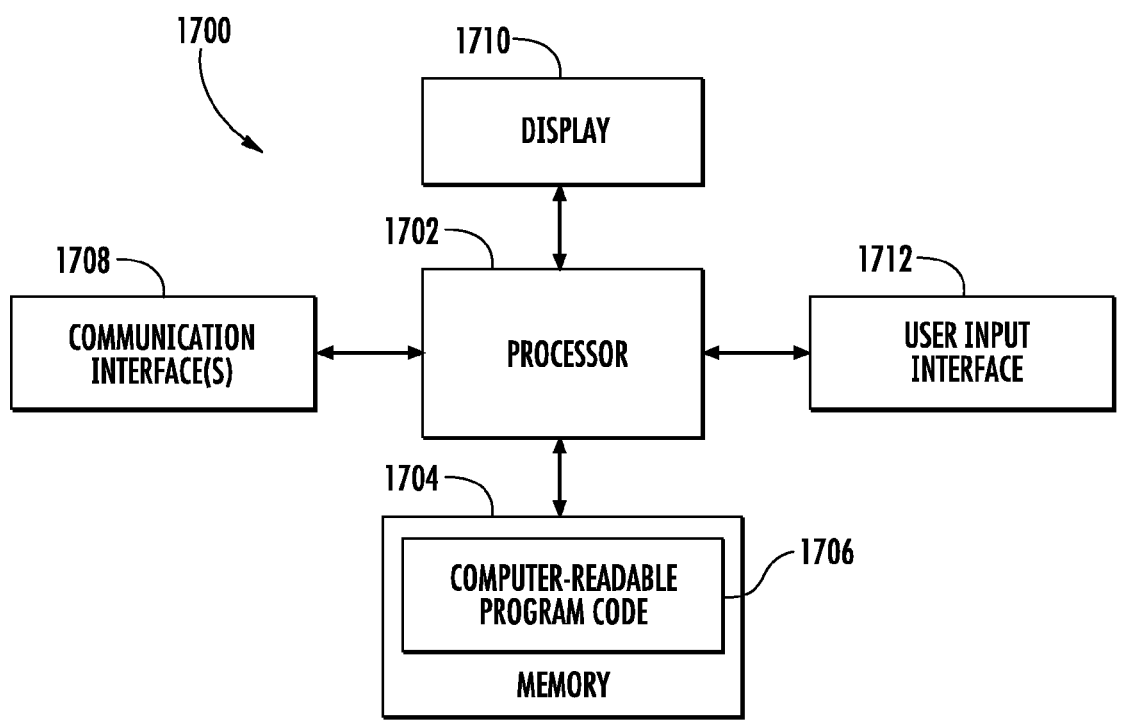
FIG. 17 illustrates an apparatus according to some example implementations.

FIG. 17 illustrates an apparatus 1700 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 1702 (e.g., processor unit) connected to a memory 1704 (e.g., storage device).

The processor 1702 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 404 (of the same or another apparatus).

The processor 1702 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 1704 is generally any piece of computer hardware that is capable of storing information such as, for example, data, computer programs (e.g., computer-readable program code 1706) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1704, the processor 1702 may also be connected to one or more interfaces for displaying, transmitting and/or receiving information. The interfaces may include a communications interface 1708 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1710 and/or one or more user input interfaces 1712 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1700 may include a processor 1702 and a computer-readable storage medium or memory 1704 coupled to the processor, where the processor is configured to execute computer-readable program code 1706 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of assembling an aircraft structure assembly composed of a plurality of sections including first and second frame sections, an interconnecting frame section and a plurality of structural mating sections, the method comprising without use of any of shimming, locating fixtures and final-hole-size drill jigs:

supporting the first and second frame sections on respective adjustable supports positioned to align the first and second frame sections in a spaced-apart relationship at a predetermined distance from each other corresponding to a length of the interconnecting frame section;

positioning the interconnecting frame section between the first and second frame sections;

aligning first pre-drilled mating holes in the interconnecting frame section with first pre-drilled mating holes in the first and second frame sections, the first pre-drilled mating holes being pre-drilled to a final hole size corresponding to first fasteners, and installing the first fasteners through the aligned, first pre-drilled mating holes without the use of locating fixtures for positioning and securing the interconnecting frame section and the first and second frame sections; and for each structural mating section of the plurality of structural mating sections:

positioning the structural mating section relative to the first and second frame sections and the interconnecting frame section; and aligning second pre-drilled mating holes in the structural mating section with second pre-drilled mating holes in at least one of the interconnecting frame section, first frame section or second frame section, and installing second fasteners through the aligned, second pre-drilled mating holes to secure the structural mating section, wherein the plurality of structural mating sections that are positioned relative to the first and second frame sections and the interconnection frame section are assembled inwardly from the first and second frame sections that form an outer perimeter structure of the aircraft structure assembly.

2. The method of claim 1 further comprising positioning the adjustable supports at baseline positions for positioning and aligning the first and second frame sections in the spaced-apart relationship, the adjustable supports being positioned using a laser metrology system.

3. The method of claim 1 further comprising numerically-controlled machining at least two of the plurality of sections based on respective three-dimensional geometry models thereof, the at least two of the plurality of sections in the respective three-dimensional models having an identical mating surface feature profile such that the at least two of the plurality of sections are machined to have an identical mating surface feature profile.

4. The method of claim 1, wherein the structural mating section is positioned, the second pre-drilled mating holes are aligned and the second fasteners are installed through the aligned, second pre-drilled mating holes, for the plurality of structural mating sections to assemble the aircraft structure assembly inwardly from the first and second frame sections that form the outer perimeter structure thereof.

5. The method of claim 1, wherein the first and second frame sections are respectively leading edge and aft frame sections, and the interconnecting frame section includes inner and outer span-wise sections, and wherein positioning the interconnecting frame section includes positioning the inner and outer span-wise sections between the leading edge and aft frame sections without use of any shimming, locating fixtures and final-hole-size drill jigs.

6. The method of claim 1, wherein the first pre-drilled mating holes are pre-drilled prior to alignment of the first pre-drilled mating holes, the first pre-drilled mating holes being pre-drilled to a nominal hole diameter that is a final hole size for a class hole diameter corresponding to the first fasteners, such that installing the first fasteners includes inserting the first fasteners through the aligned, first pre-drilled mating holes without use of locating fixtures for positioning and securing the interconnecting frame section and first and second frame sections relative to each other.

7. The method of claim 1, wherein the second pre-drilled mating holes are pre-drilled prior to alignment of the second pre-drilled mating holes, the second pre-drilled mating holes being pre-drilled to a nominal hole diameter that is a final hole size for a class hole diameter corresponding to the second fasteners, such that installing the second fasteners includes inserting the second fasteners through the aligned, second pre-drilled mating holes without use of locating fixtures for positioning and securing the structural mating section and the at least one of the interconnecting frame section, first frame section or second frame section relative to each other.

8. A method of assembling an aircraft wing assembly composed of a plurality of sections including leading edge and aft frame sections, inner and outer span-wise sections and a plurality of internal structural members, the method comprising without use of any of locating fixtures for alignment of the plurality of sections and final-hole-size drill jigs for drilling holes:

supporting the leading edge and aft frame sections on respective adjustable supports positioned to align the leading edge and aft frame sections in a spaced-apart relationship at a predetermined distance from each other corresponding to lengths of the inner and outer span-wise sections;

positioning the inner and outer span-wise sections between the leading edge and aft frame sections;

aligning first pre-drilled mating holes in the inner and outer span-wise sections with first pre-drilled mating holes in the leading edge and aft frame sections, the first pre-drilled mating holes being pre-drilled to a final hole size corresponding to first fastners, and installing the first fasteners through the aligned, first pre-drilled mating holes without the use of locating fixtures for positioning and securing the inner and outer span-wise sections and the leading edge and aft frame sections, to thereby form an outer perimeter structure of the aircraft wing assembly; and for each internal structural member of the plurality of internal structural members:

positioning the internal structural member within the outer perimeter structure;

aligning second pre-drilled mating holes in the internal structural member with second pre-drilled mating holes in at least one of another internal structural member of the plurality of internal structural members, the inner span-wise section or the outer span-wise section, and installing second fasteners through the aligned, second pre-drilled aligned holes to secure the internal structural member, wherein the plurality of internal structural members that are positioned relative to the leading edge and aft frame sections and the inner and outer span-wise sections are assembled inwardly from the leading edge and aft frame sections that form the outer perimeter structure of the aircraft wing assembly.

9. The method of claim 8, wherein each of the plurality of internal structural members includes a main spar, and for each of the plurality of internal structural members including the main spar, positioning the internal structural member and aligning second pre-drilled mating holes comprises:

positioning the main spar within the outer perimeter structure; and aligning second pre-drilled mating holes in the main spar with second pre-drilled mating holes in at least one of another internal structural member of the plurality of internal structural members, the inner span-wise section or the outer span-wise section, and installing the second fasteners through the aligned, second pre-drilled aligned holes to secure the main spar.

10. The method of claim 8, wherein the aircraft wing assembly is further composed of one or more outer skin portions, and the method further comprises without use of any locating fixtures and final-hole-size drill jigs:
positioning the one or more outer skin portions relative to the outer perimeter structure;
aligning third pre-drilled mating holes in the one or more outer skin portions with third pre-drilled mating holes in the outer perimeter structure, and installing third fasteners through the aligned, third pre-drilled mating holes to secure the one or more outer skin portions.

11. The method of claim 8 further comprising positioning the adjustable supports at baseline positions for positioning and aligning the leading edge and aft frame sections in the spaced-apart relationship, the adjustable supports being positioned using a laser metrology system.

12. The method of claim 8 further comprising numerically-controlled machining at least two of the plurality of sections based on respective three-dimensional geometry models thereof, the at least two of the plurality of sections in the respective three-dimensional models having an identical mating surface feature profile such that the at least two of the plurality of sections are machined to have an identical mating surface feature profile.

13. The method of claim 8, wherein the first pre-drilled mating holes are pre-drilled prior to alignment of the first pre-drilled mating holes, the first pre-drilled mating holes being pre-drilled to a nominal hole diameter that is a final hole size for a class hole diameter corresponding to the first fastners, such that installing the first fasteners includes inserting the first fasteners through the aligned, first pre-drilled mating holes without use of locating fixtures for positioning and securing the inner and outer span-wise sections and leading edge and aft frame sections relative to each other.

14. The method of claim 8, wherein the second pre-drilled mating holes are pre-drilled prior to alignment of the second pre-drilled mating holes, the second pre-drilled mating holes being pre-drilled to a nominal hole diameter that is a final hole size for a class hole diameter corresponding to the second fastners, such that installing the second fasteners includes inserting the second fasteners through the aligned, second pre-drilled mating holes without use of locating fixtures for positioning and securing the internal structural member and the at least one of the other internal structural member, the inner span-wise section or outer span-wise section relative to each other.

* * * * *